United States Patent
Takashima et al.

(10) Patent No.: US 7,610,786 B2
(45) Date of Patent: Nov. 3, 2009

(54) APPARATUS FOR FORMING MICROSCOPIC RECESSES ON A CYLINDRICAL BORE SURFACE AND METHOD OF FORMING THE MICROSCOPIC RECESSES ON THE CYLINDRICAL BORE SURFACE BY USING THE APPARATUS

(75) Inventors: Kazuhiko Takashima, Yokohama (JP); Minoru Ota, Kanagawa (JP); Yoshitaka Uehara, Yokohama (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 350 days.

(21) Appl. No.: 11/296,252

(22) Filed: Dec. 8, 2005

(65) Prior Publication Data

US 2006/0130331 A1 Jun. 22, 2006

(30) Foreign Application Priority Data

Dec. 21, 2004 (JP) ............................ 2004-368628
Mar. 25, 2005 (JP) ............................ 2005-087556
May 30, 2005 (JP) ............................ 2005-157033
May 30, 2005 (JP) ............................ 2005-157035

(51) Int. Cl.
*B21B 27/00* (2006.01)

(52) U.S. Cl. ............................ 72/102; 72/112; 72/120; 72/123

(58) Field of Classification Search ............. 72/75, 72/102, 112, 120, 122, 123, 406, 434, 441, 72/446, 447, 74, 82, 94, 121; 29/90.01; 451/28
See application file for complete search history.

(56) References Cited

U.S. PATENT DOCUMENTS

| | | | | |
|---|---|---|---|---|
| 2,166,923 A | * | 7/1939 | Woodcock | 409/192 |
| 3,696,483 A | * | 10/1972 | Burk | 29/90.01 |
| 3,735,615 A | * | 5/1973 | Shneider | 72/75 |
| 4,502,822 A | * | 3/1985 | Fischer | 409/32 |
| 4,536,931 A | * | 8/1985 | Roper | 29/90.01 |
| 5,129,249 A | * | 7/1992 | Fournier | 72/70 |
| 5,247,819 A | * | 9/1993 | Morimoto et al. | 72/122 |
| 5,333,480 A | * | 8/1994 | Berstein | 72/110 |
| 5,467,627 A | * | 11/1995 | Smith et al. | 72/121 |
| 5,488,880 A | * | 2/1996 | Sartorio | 74/89.31 |
| 5,931,038 A | * | 8/1999 | Higashi | 72/70 |
| 6,003,353 A | * | 12/1999 | Ootani et al. | 72/31.1 |
| 7,134,304 B2 | * | 11/2006 | Nakayama et al. | 72/102 |

(Continued)

FOREIGN PATENT DOCUMENTS

JP 2002-307310 A 10/2002

*Primary Examiner*—Edward Tolan
(74) *Attorney, Agent, or Firm*—Foley & Lardner LLP

(57) ABSTRACT

An apparatus for forming microscopic recesses on a circumferential surface that defines a cylindrical bore in a workpiece, the apparatus including a form roller, a form roller drive driving the form roller to rotate about a rotation axis in an axially offset position in which the rotation axis is offset from a central axis of the cylindrical bore, an axial drive causing a relative axial movement of the workpiece and the form roller drive along the central axis of the cylindrical bore, and a rotary drive driving at least one of the workpiece and the form roller drive to rotate about the central axis of the cylindrical bore while keeping an outer peripheral surface of the form roller pressing against the circumferential surface that defines a cylindrical bore.

20 Claims, 19 Drawing Sheets

U.S. PATENT DOCUMENTS 7,188,499 B2 * 3/2007 Ogaki et al. .................. 72/102
7,238,637 B2 * 7/2007 Garoff et al. ................ 502/115
2005/0245178 A1 11/2005 Takashima et al.

* cited by examiner

APPARATUS FOR FORMING MICROSCOPIC RECESSES ON A CYLINDRICAL BORE SURFACE AND METHOD OF FORMING THE MICROSCOPIC RECESSES ON THE CYLINDRICAL BORE SURFACE BY USING THE APPARATUS

BACKGROUND OF THE INVENTION

The present invention relates to an apparatus for forming microscopic recesses on a circumferential surface that defines a cylindrical bore in a workpiece and comes into sliding contact with a counterpart, and a method of forming microscopic recesses on the circumferential surface thereof by using the apparatus. More specifically, the present invention relates to an apparatus for forming microscopic recesses as oil retention portions on the circumferential surface, for instance, a cylinder bore surface of a cylinder block of an engine for automobiles, an outer circumferential surface of a cam shaft of the engine and the like, in order to reduce friction on the cylinder bore surface, and relates to a method of forming microscopic recesses on the circumferential surface by using the apparatus.

Conventionally, upon forming microscopic recesses on a circumferential surface that defines a cylindrical bore in a workpiece, the circumferential surface is subjected to shot blasting. Upon shot blasting, a masking sheet with through-holes having a predetermined shape is attached to the circumferential surface, and then small-diameter shots, such as ceramic balls, are blasted with compressed air against the circumferential surface. As a result, microscopic recesses are formed on a part of the circumferential surface which is exposed outside through the through-holes. Subsequently, the masking sheet is taken off, and the circumferential surface is subjected to cleaning and honing to thereby remove protrudent peripheral portions around the microscopic recesses which are formed upon shot blasting. Japanese Patent Application First Publication No. 2002-307310 describes such a masking and blasting method as explained above.

SUMMARY OF THE INVENTION

However, in the shot blasting process of the conventional art as described above, it is difficult to regularly form the microscopic recess, and the operations of attaching and removing the masking sheet are inevitably required. This leads to failure of improvement in productivity. In addition, the use of the disposable masking sheet requires increased costs for a masking sheet material and adhesives, as well as costs of forming the through-holes in the masking sheet each time upon conducting the microscopic recess-forming process. This results in significant increase in production cost for production of the circumferential surface having the microscopic recesses.

It is an object of the present invention to provide an apparatus for forming microscopic recesses on a circumferential surface that defines a cylindrical bore in a workpiece and a method of forming the microscopic recesses on the circumferential surface by using the apparatus, which are capable of forming the microscopic recesses on the circumferential surface with high accuracy, improving the productivity and saving the production costs.

It is a further object of the present invention to provide an apparatus for forming microscopic recesses on a circumferential surface that defines a cylindrical bore in a workpiece and a method of forming the microscopic recesses on the circumferential surface by using the apparatus, which are capable of forming a predetermined pattern of the microscopic recesses on the circumferential surface regardless of a material and a hardness of the workpiece or a diameter of the cylindrical bore.

In one aspect of the present invention, there is provided an apparatus for forming microscopic recesses on a circumferential surface that defines a cylindrical bore in a workpiece, the apparatus comprising:

a form roller including microscopic projections that are formed on an outer peripheral surface thereof, the form roller being operative to form the microscopic recesses on the circumferential surface of the cylindrical bore in the workpiece;

a form roller drive that supports the form roller in coaxial relation thereto and drives the form roller to rotate about a rotation axis in an axially offset position in which the rotation axis is offset from a central axis of the cylindrical bore in the workpiece;

an axial drive that causes a relative axial movement of the workpiece and the form roller drive along the central axis of the cylindrical bore in the workpiece; and a rotary drive that drives at least one of the workpiece and the form roller drive to rotate about the central axis of the cylindrical bore in the workpiece while keeping the outer peripheral surface of the form roller pressing against the circumferential surface that defines the cylindrical bore in the workpiece.

In a further aspect of the present invention, there is provided an apparatus for forming microscopic recesses on a circumferential surface that defines a cylindrical bore in a workpiece, the apparatus comprising:

a tool holder disposed coaxially with the cylindrical bore;

a form roller support disposed on the tool holder so as to be moveable in a direction perpendicular to a central axis of the tool holder;

a form roller supported on the form roller support so as to be rotatable about a rotation axis that is offset from the central axis of the tool holder in parallel relation thereto, the form roller being operative to form the microscopic recesses on the circumferential surface that defines the cylindrical bore in the workpiece;

a load applying member that applies a load to the form roller so as to press the form roller against the circumferential surface that defines the cylindrical bore in the workpiece;

a form roller drive that drives the form roller to rotate about the rotation axis; and a rotary drive that causes a relative rotation of the workpiece and the tool holder about a central axis of the cylindrical bore in the workpiece.

In a still further aspect of the present invention, there is provided an apparatus for forming microscopic recesses on a circumferential surface that defines a cylindrical bore in a workpiece, the apparatus comprising:

a main shaft;

a tool holder disposed on the main shaft so as to be in axial alignment with the main shaft, the tool holder being rotatable about a rotation axis together with the main shaft;

a form roller support disposed on the tool holder, the form roller support including a support shaft parallel to the main shaft;

a form roller supported on the support shaft of the form roller support so as to be rotatable together with the support shaft, the form roller being formed with microscopic projections on an outer peripheral surface thereof;

a load applying member that applies a load to the form roller support in a radial direction of the form roller to press the microscopic projections of the form roller against the circumferential surface that defines the cylindrical bore in the workpiece under condition that the rotation axis of the tool holder is in alignment with a central axis of the cylindrical bore; and a rotational resistance varying member that vary rotational resistance of the form roller.

In a still further aspect of the present invention, there is provided an apparatus for forming microscopic recesses on a circumferential surface that defines a cylindrical bore in a workpiece, the apparatus comprising:

a form roller having microscopic projections on an outer peripheral surface thereof which are configured to form the microscopic recesses;

a form roller support that supports the form roller so as to be rotatable about a rotation axis;

a tool holder that retains the form roller support such that a central axis of the cylindrical bore in the workpiece is parallel to the rotation axis of the form roller;

a form roller pressing drive that presses the form roller against the circumferential surface that defines the cylindrical bore in the workpiece;

a rotary drive that causes a relative rotation of the workpiece and the tool holder about the central axis of the cylindrical bore in the workpiece;

an axial drive that causes a relative axial movement of the workpiece and the tool holder along the central axis of the cylindrical bore in the workpiece; and a control unit that controls the axial drive to vary a speed of the relative axial movement of the workpiece and the tool holder on the basis of a diameter of the cylindrical bore in the workpiece.

In a still further aspect of the present invention, there is provided an apparatus for forming microscopic recesses on a circumferential surface that defines a cylindrical bore in a workpiece, the apparatus comprising:

a form roller having microscopic projections on an outer peripheral surface thereof which are configured to form the microscopic recesses;

a form roller support that supports the form roller so as to be rotatable about a rotation axis;

a tool holder that retains the form roller support such that a central axis of the cylindrical bore in the workpiece is parallel to the rotation axis of the form roller;

a form roller pressing drive that presses the form roller against the circumferential surface that defines the cylindrical bore in the workpiece;

a rotary drive that causes a relative rotation of the workpiece and the tool holder about the central axis of the cylindrical bore in the workpiece;

an axial drive that causes a relative axial movement of the workpiece and the tool holder along the central axis of the cylindrical bore in the workpiece; and a control unit that controls the axial drive to vary a speed of the relative axial movement of the workpiece and the tool holder on the basis of an error of an actual pattern of the microscopic recesses formed on the circumferential surface that defines the cylindrical bore in the workpiece with respect to a reference pattern of the microscopic recesses.

DETAILED DESCRIPTION OF THE INVENTION

Figure 1:
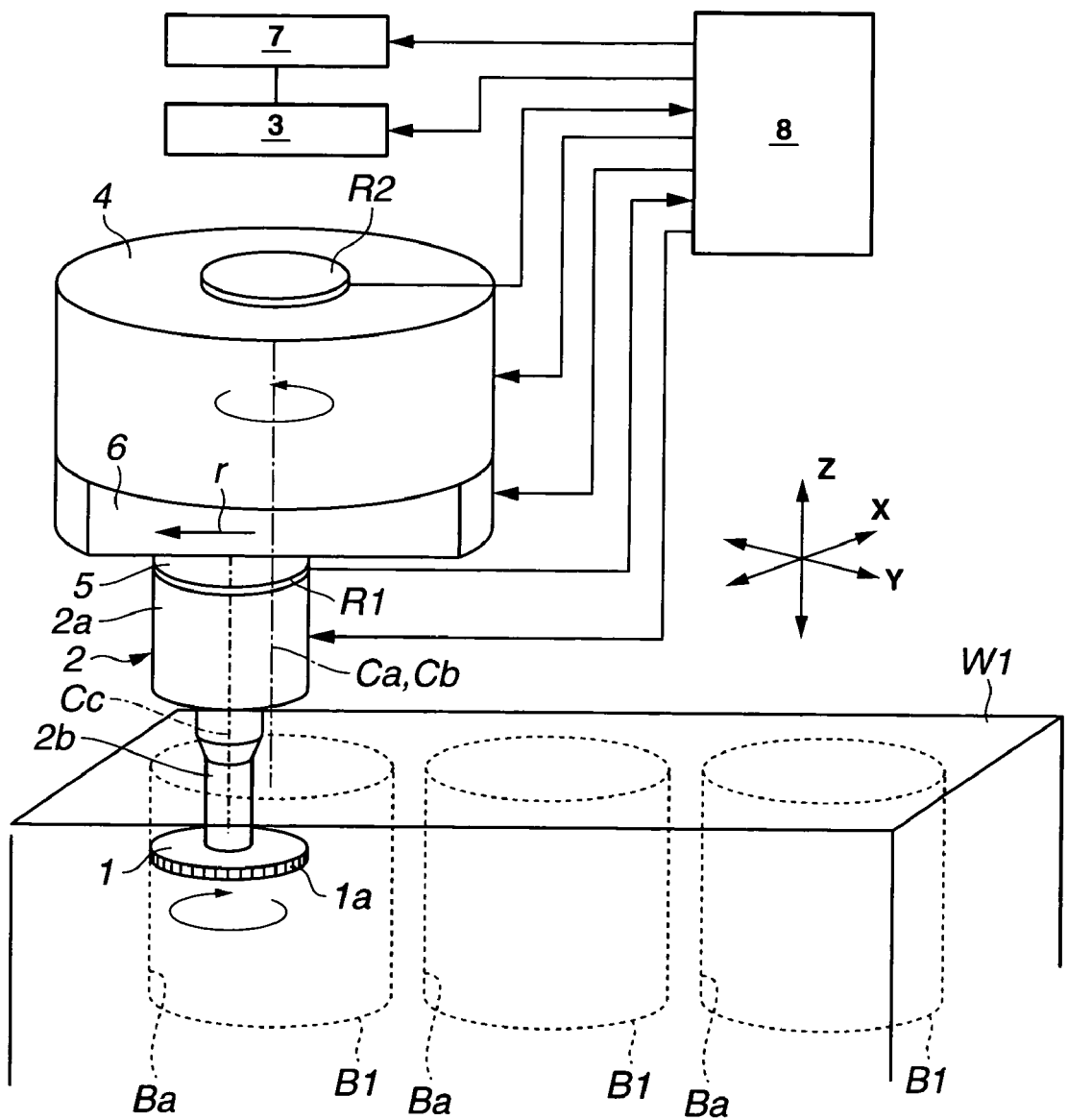
FIG. 1 is a perspective view of an apparatus according to a first embodiment of the present invention.

In the followings, embodiments of the present invention will be described with reference to the accompanying drawings. The terms "upper", "lower", "upward", "downward", "rightward" and "leftward" used in the description merely denote directions as viewed in the drawings. FIG. 1 illustrates a first embodiment of an apparatus for forming microscopic recesses on a circumferential surface that defines a cylindrical bore of a workpiece, according to the present invention. In the first embodiment as shown in FIG. 1, workpiece W1 is a cylinder block of an engine for automobiles, and the cylindrical bore of the workpiece is cylinder bore B1. Microscopic recesses are formed on circumferential surface Ba that defines cylinder bore B1. The first embodiment of the apparatus according to the present invention may be incorporated to a machine tool, for instance, a numerical control machine tool, i.e., a NC machine tool. Upon using the apparatus, the cylinder block as workpiece W1 is positioned such that central axis Ca of cylinder bore B1 is aligned with a vertical direction as indicated at Z in FIG. 1.

As illustrated in FIG. 1, the apparatus includes form roller 1 with microscopic projections 1a, and form roller drive 2 that drives form roller 1 to rotate about rotation axis Cc. Form roller 1 has a single row of microscopic projections 1a on an outer peripheral surface thereof. Microscopic projections 1a act to form microscopic recesses on circumferential surface Ba that defines cylinder bore B1 of the cylinder block as workpiece W1. Form roller drive 2 supports form roller 1 in axial alignment therewith and drives form roller 1 to rotate about rotation axis Cc in an offset position in which rotation axis Cc is offset from central axis Ca of cylinder bore B1 of the cylinder block. The apparatus further includes axial drive 3 that causes a relative axial movement of the cylinder block and form roller drive 2 along central axis Ca of cylinder bore B1. The apparatus further includes rotary drive 4 drives at least one of the cylinder block and form roller drive 2 so as to turn about central axis Ca of cylinder bore B1.

Rotary drive 4 includes a drive source, not shown, and a cylindrical-shaped form roller drive holder that supports form roller drive 2. The form roller drive holder is driven by the drive source so as to turn about central axis Ca of cylinder bore B1 together with form roller drive 2. Rotary drive 4 has rotation axis Cb and supports form roller drive 2 in an offset position in which rotation axis Cc of form roller 1 is offset from rotation axis Cb under condition that rotation axis Cb is in alignment with central axis Ca of cylinder bore B1. In this state, central axis Ca of cylinder bore B1, rotation axis Cb of rotary drive 4 and rotation axis Cc of form roller 1 are parallel to each other.

Form roller 1 may be made of a suitable material, for instance, cemented carbide, hard metal, alumina, ceramic such as silicon nitride, and the like. Form roller 1 has a diameter considerably smaller than a diameter of cylinder bore B1. Microscopic projections 1a formed on the outer peripheral surface of form roller 1 are arranged in a circumferentially equidistant relation to one another and configured to form dimple-shaped microscopic recesses on circumferential surface Ba of cylinder bore B1. Microscopic projections 1a may be in the form of a circumferentially continuous projection so as to form a continuously extending microscopic groove.

Form roller drive 2 includes body 2a with a built-in motor, and shaft 2b that is coaxially connected with a lower end portion of body 2a and rotatably driven by the motor in body 2a. Form roller 1 is mounted to an axial lower end portion of shaft 2b. Various kinds of form rollers which are different in diameter and shape of the microscopic projections may be selectively used and detachably mounted to the axial lower end portion of shaft 2b.

Roller radial drive 6 is disposed on a lower surface of rotary drive 4. Roller radial drive 6 drives form roller drive 2 with form roller 1 to move in a radial direction of cylinder bore B1 as indicated at r in FIG. 1. Roller radial drive 6 includes a drive source, for instance, such as a motor, a power transmission device, and joint 5 that is displaceable in a direction of a diameter of holder 4. Form roller drive 2 is fixedly mounted to joint 5.

Axial drive 3 causes the relative axial movement of the cylinder block and form roller drive 2 along central axis Ca of cylinder bore B1 as described above. In this embodiment, axial drive 3 drives rotary drive 4 to move in a vertical direction as indicated at Z in FIG. 1, such that form roller drive 2 with form roller 1 is moved relative to the cylinder block in the vertical direction.

Rotation angle detector R1 that detects a rotation angle of form roller 1 is provided on an upper end portion of body 2a of form roller drive 2. Rotation angle detector R1 is supported on rotary drive 4 via joint 5 of roller radial drive 6. Further, rotation angle detector R2 that detects a rotation angle of rotary drive 4 is provided on an upper surface of rotary drive 4. Each of rotation angle detectors R1 and R2 is preferably a rotary encoder. By using the rotary encoder, the apparatus of this embodiment can be more simplified and improved in accuracy of the detection.

The apparatus further includes horizontal drive 7 and control unit 8. Horizontal drive 7 drives rotary drive 4 together with form roller drive 2 and form roller 1 to move in a horizontal direction as indicated at X or Y in FIG. 1. Control unit 8 controls operations of horizontal drive 7, axial drive 3, rotary drive 4, roller radial drive 6 and form roller drive 2. Control unit 8 also conducts feedback control of rotary drive 4 and form roller drive 2 on the basis of detection signals that are transmitted from rotation angle detectors R1 and R2.

A method of forming microscopic recesses on circumferential surface Ba of cylinder bore B1 by using the apparatus of this embodiment will be explained hereinafter. First, horizontal drive 7 drives rotary drive 4 to horizontally move to a position in which rotation axis Cb of rotary drive 4 is aligned with central axis Ca of cylinder bore B1. Subsequently, axial drive 3 drives rotary drive 4 to downwardly move such that form roller 1 is advanced into cylinder bore B1.

Figure 2:
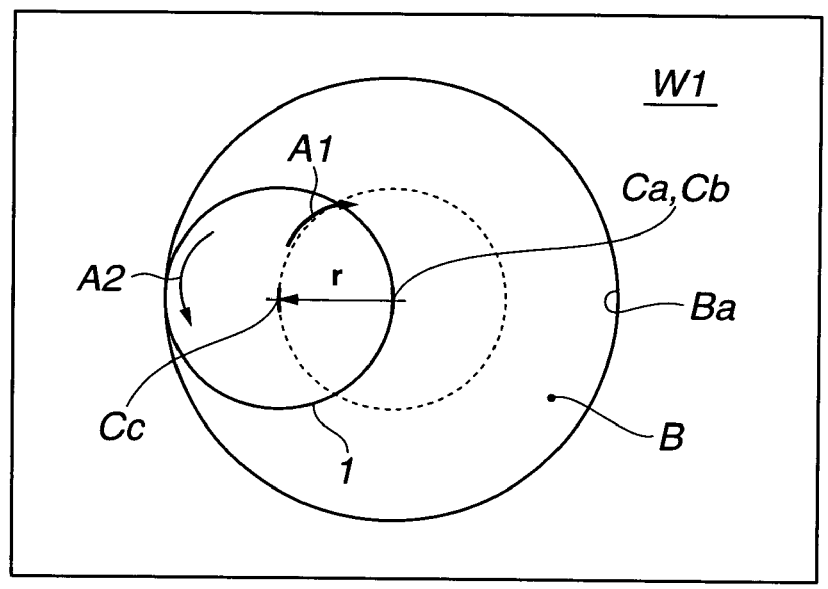
FIG. 2 is a schematic plan view of a form roller of the apparatus of the first embodiment and a cylindrical bore in a workpiece, which illustrates an operation of the form roller upon forming microscopic recesses.

Next, roller radial drive 6 drives form roller drive 2 to horizontally move to an offset position in which rotation axis Cc of form roller 1 is offset from rotation axis Cb of rotary drive 4, and form roller 1 presses against circumferential surface Ba of cylinder bore B1 by a predetermined pressing force. Rotary drive 4 then drives form roller drive 2 to turn about central axis Ca of cylinder bore B1. In synchronized relation between form roller drive 2 and rotary drive 4, form roller drive 2 drives form roller 1 to rotate about rotation axis Cc. In this condition, as shown in FIG. 2, if rotation axis Cc of form roller drive 2 and form roller 1 is rotated about central axis Ca of cylinder bore B1 in direction A1 and, at the same time, form roller 1 is rotated about rotation axis Cc in direction A2 opposite to direction A1, form roller 1 will be caused to roll on circumferential surface Ba of cylinder bore B1. By thus rotationally operating form roller 1 about rotation axis Cc thereof and central axis Ca of cylinder bore B1 in the opposite directions, the microscopic recesses are formed on circumferential surface Ba of cylinder bore B1 while preventing slippage that will be caused between form roller 1 and circumferential surface Ba.

Further, when in combination with the above-described operation, axial drive 3 drives rotary drive 4 to gradually downwardly move and keep advancement of form roller 1 into cylinder bore B1, form roller 1 makes a spiral trail along circumferential surface Ba of cylinder bore B1 and continuously forms the microscopic recesses on circumferential surface Ba. Thus, the microscopic recesses can be formed over a predetermined axial region along central axis Ca of cylinder bore B1.

Here, if form roller 1 rolls on circumferential surface Ba of cylinder bore B1 without slippage under condition that an outer diameter of form roller 1 is 30 mm, the number of microscopic projections 1a is 100, and a diameter of cylinder bore B1 is 60 mm, the number of microscopic recesses formed on circumferential surface Ba per turn of form roller 1 about central axis Ca of cylinder bore B1 is 200. Since a ratio of the diameter of cylinder bore B1 to the outer diameter of form roller 1 is 60:30, form roller 1 is rotated about rotation axis Cc by two turns while turning about central axis Ca of cylinder bore B1, namely, while rotary drive 4 is rotated about rotation axis Cb by one turn. That is, if rotary drive 4 is rotated about rotation axis Cb by one turn, form roller 1 can be rotated about rotation axis Cc by two turns. Specifically, if rotary drive 4 is rotated about rotation axis Cb by 0.5 degree, form roller 1 can be rotated about rotation axis Cc by 1 degree.

Figure 3A:
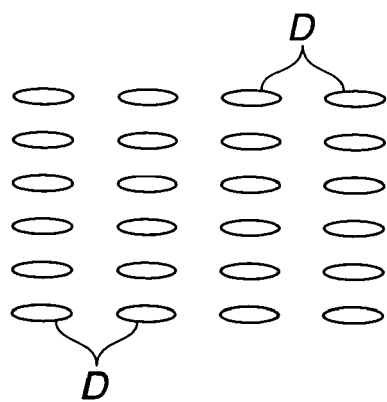
FIGS. 3A and 3B are diagrams that illustrate different patterns of the microscopic recesses formed by the apparatus of the first embodiment of the present invention, respectively.

The rotation of rotary drive 4, the rotation of form roller 1 by form roller drive 2, and the downward movement of form roller drive 2 with form roller 1 are synchronized as described above, so that a regular pattern of the microscopic recesses can be formed over a wide region of circumferential surface Ba of cylinder bore B1 with increased accuracy and efficiency. FIG. 3A illustrates the regular pattern of microscopic recesses D which are in alignment with one another in both a vertical direction and a lateral direction perpendicular to the vertical direction.

Further, if the number of microscopic recesses formed on circumferential surface Ba of cylinder bore B1 is set to 200.5, form roller 1 will be rotated about rotation axis Cc by two turns plus 1.8 degrees, while rotary drive 4 is rotated about rotation axis Cb by one turn. Namely, because an angular pitch between microscopic projections 1a of form roller 1 is 3.6 degrees (360 degrees/100 microscopic projections), the rotation angle of form roller 1 is 721.8 degrees, while the rotation angle of rotary drive 4 is 360 degrees. Accordingly, the rotation angle of rotary drive 4 relative to 1 degree of the rotation angle of form roller 1 is 0.498 degree as calculated by dividing 360 degrees by 721.8 degrees.

Figure 3B:
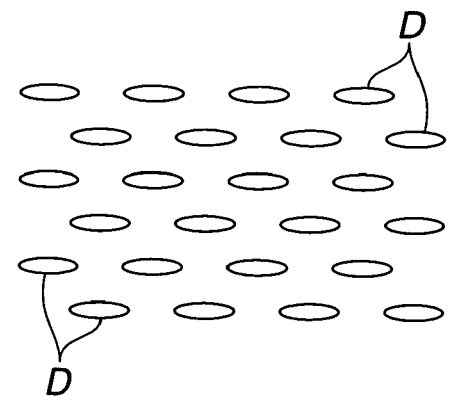

By thus synchronizing the rotation of rotary drive 4, the rotation of form roller 1 by form roller drive 2, and the downward movement of form roller drive 2 with form roller 1, an offset pattern of the microscopic recesses as shown in FIG. 3B can be formed over a wide region of circumferential surface Ba of cylinder bore B1 with increased accuracy and efficiency. In FIG. 3B, microscopic recesses D are formed in vertical offset relation to one another.

As explained above, the apparatus of this embodiment of the present invention has a relatively simple structure, and therefore, the apparatus as well as the method using the apparatus can serve for reducing the production cost of the microstructure. Especially, since the respective drives are disposed on the side of not the workpiece but form roller 1, the positioning of the cylinder block can be more simply performed. Accordingly, the apparatus and the method of this embodiment of the present invention is more suitable for forming microscopic recesses on a circumferential surface of a cylinder bore of workpieces that are sequentially transported in line.

Further, upon forming the microscopic recesses on circumferential surface Ba of cylinder bore B1, form roller 1 is used without need of the disposable masking sheet as conventionally used. This attains efficient formation of the microscopic recesses with high accuracy and realizes further improvement of productivity and more saving of the production costs.

Further, as explained above, form roller drive 2 is driven to turn about central axis Ca of cylinder bore B1, and at the same time, form roller 1 is driven to rotate about rotation axis Cc. Therefore, even when the material of the workpiece is different from that of form roller 1 and the depth of the microscopic recesses is varied, the microscopic recesses can be formed with high accuracy while preventing slippages that is caused between circumferential surface Ba of cylinder bore B1 and the circumferential surface of form roller 1.

Further, with the provisions of rotation angle detectors R1 and R2, the microscopic recesses can be formed while monitoring the slippages that is caused between circumferential surface Ba of cylinder bore B1 and the circumferential surface of form roller 1. This serves for enhancing the accuracy of formation of the microscopic recesses. Furthermore, by using roller radial drive 6, even when cylinder bores B1 are different in diameter, the material of the workpiece is different from that of form roller 1, and the depth of the microscopic recesses is varied, the microscopic recesses can be readily formed.

Figure 4:
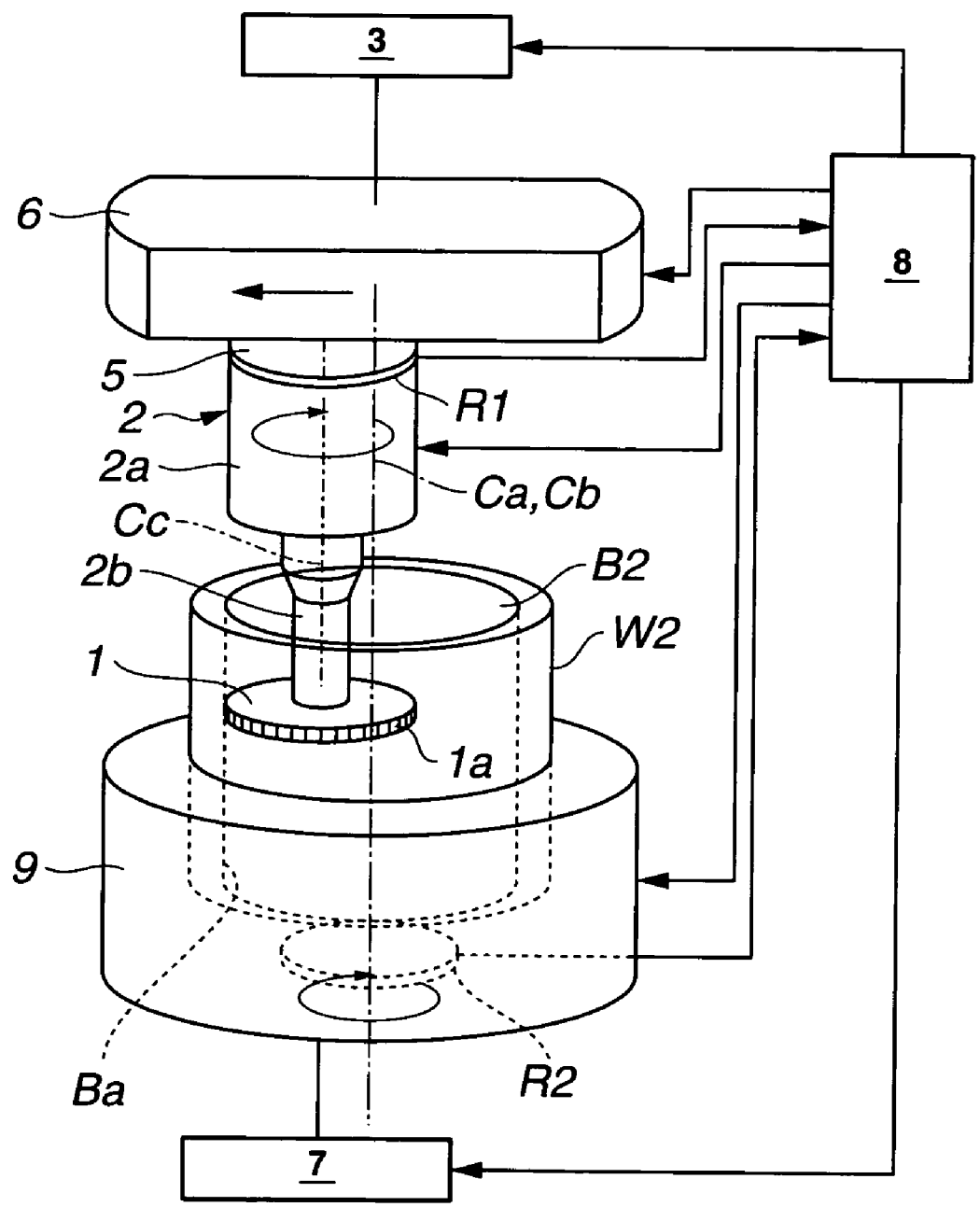
FIG. 4 is a perspective view of an apparatus according to a second embodiment of the present invention.

Referring to FIG. 4, a second embodiment of the apparatus and method of the present invention will be explained hereinafter. The second embodiment differs from the first embodiment in that the rotary drive supports the workpiece. Like reference numerals denote like parts, and therefore, detailed explanations therefor are omitted. In this embodiment, workpiece W2 is a cylindrical member. As illustrated in FIG. 4, the apparatus includes workpiece support 9 as the rotary drive which supports workpiece W2 with cylindrical bore B2. Workpiece support 9 supports workpiece W2 under condition that rotation axis Cb of workpiece support 9 is aligned with central axis Ca of cylindrical bore B2. Workpiece support 9 includes a drive source, not shown, and is driven by the drive source so as to rotate about rotation axis Cb together with workpiece W2. Workpiece support 9 also is driven by horizontal drive 7 so as to move together with workpiece W2 in the horizontal direction, namely, in direction X and direction Y as shown in FIG. 1.

Rotation angle detector R2 is provided on workpiece support 9 and detects a rotation angle of workpiece support 9. Axial drive 3 drives roller radial drive 6 to move in the vertical direction as indicated at Z in FIG. 1, such that form roller drive 2 with form roller 1 is moved relative to workpiece W2 in the vertical direction.

In the method using the thus-constructed apparatus of the second embodiment, form roller 1 is rotated about rotation axis Cc and turned about central axis Ca of cylindrical bore B2 of workpiece W2, while workpiece W2 is rotated about central axis Ca of cylindrical bore B2. As a result, the microscopic recesses are formed on circumferential surface Ba of cylindrical bore B2 of workpiece W2.

The apparatus and method of the second embodiment can attain the same effects as those of the first embodiment as explained above. Further, in a case where the apparatus of this embodiment is applied to the conventional NC machine tool, a main shaft head can be used as axial drive 3, and a work table can be used as horizontal drive 7. In such a case, a structure of the NC machine tool to which the apparatus of this embodiment is applied can be further simplified.

The apparatus and method of the second embodiment may be used for formation of microscopic recesses on a circumferential surface that defines a cylindrical bore of various kinds of members as a workpiece, without being limited to the cylinder block in the first embodiment and the cylindrical member in the second embodiment. Further, the microscopic projections on the outer peripheral surface of the form roller are not limited to the single row as described in the first embodiment, and may be formed in double rows. Furthermore, the rotary drive, the axial drive and the horizontal drive which cause the relative movement of the workpiece and the form roller may be provided on at least one of the side of the workpiece and the side of the form roller.

Figure 5:
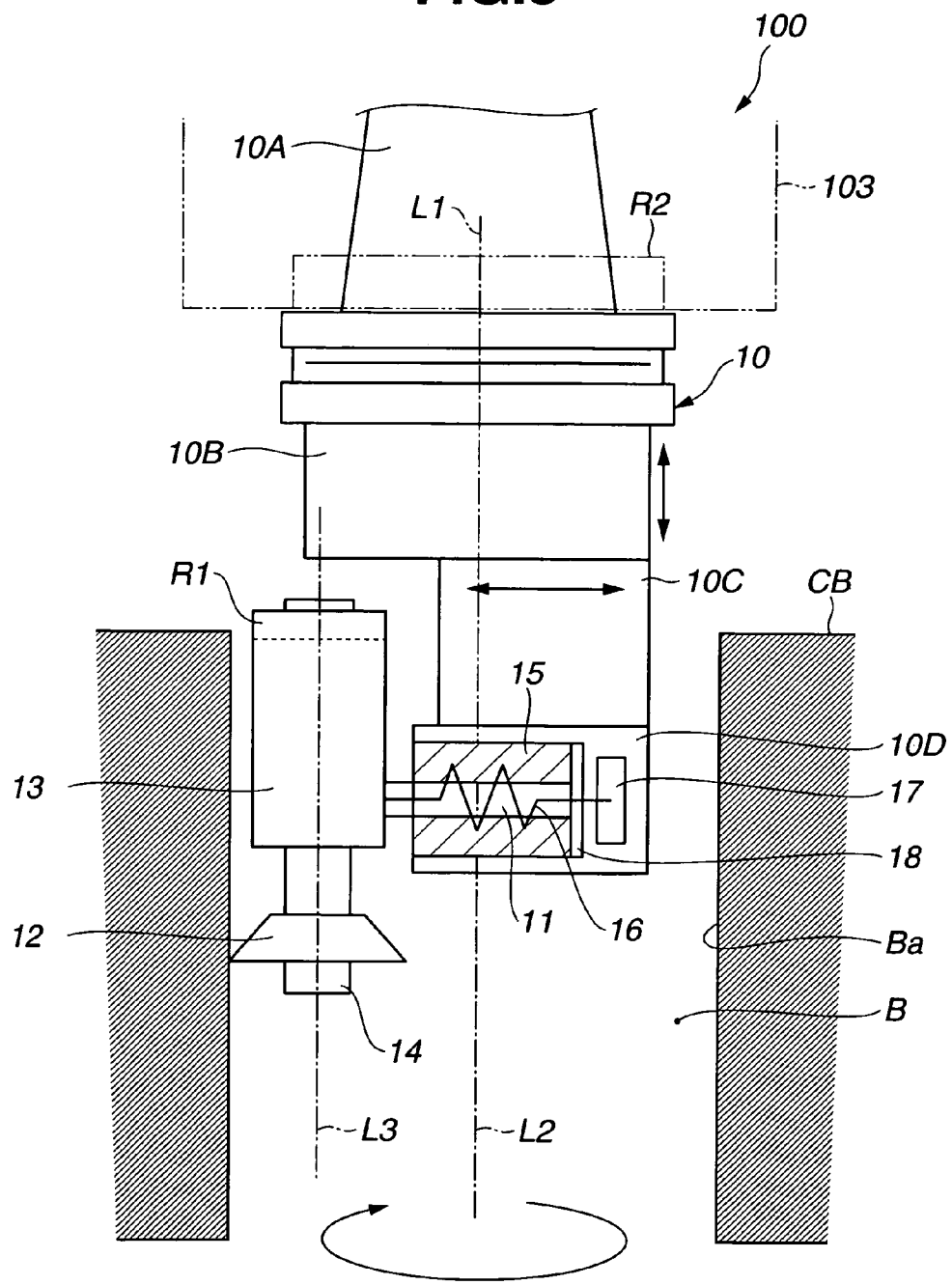
FIG. 5 is a vertical cross-section of an apparatus according to a third embodiment of the present invention.
Figure 6:
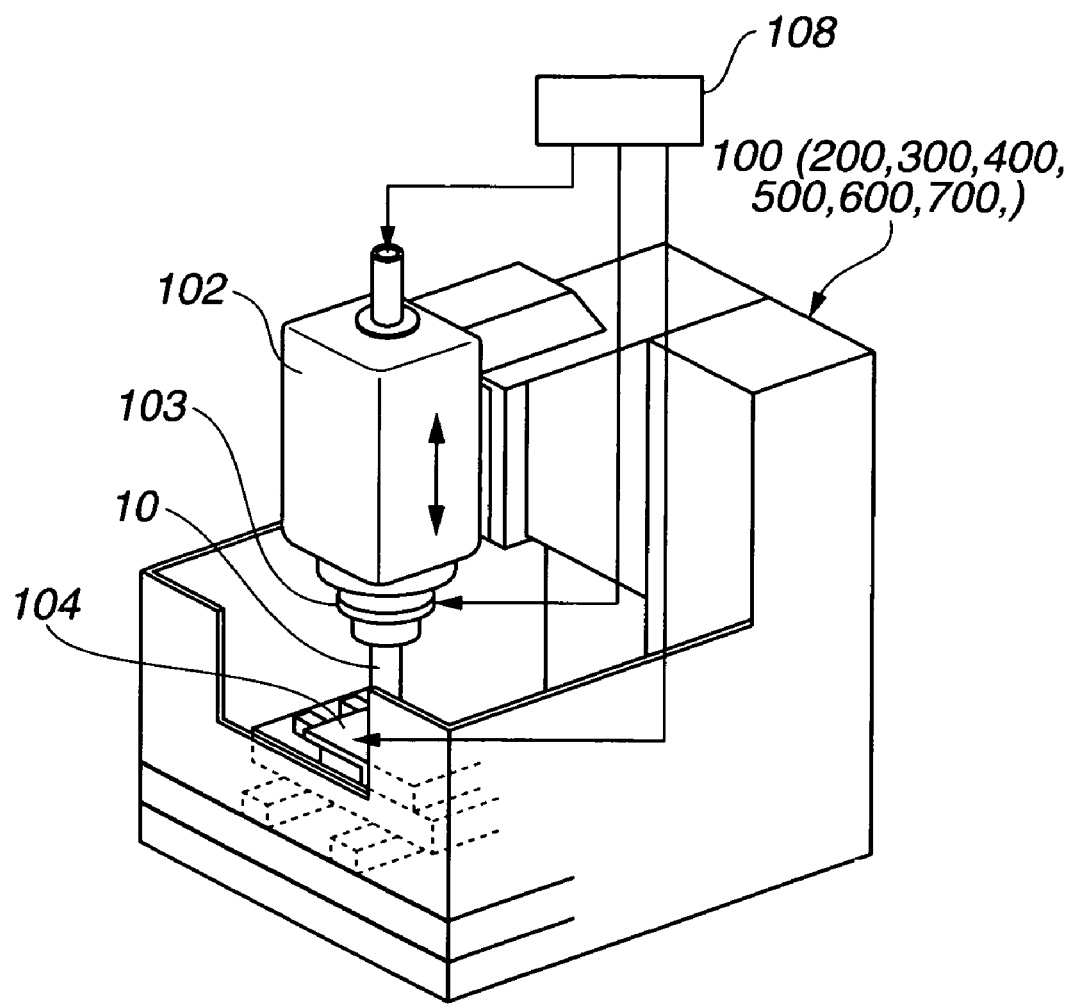
FIG. 6 is a perspective view of the whole apparatus of the third embodiment of the present invention.

Referring to FIGS. 5-10C, a third embodiment of the apparatus of the present invention will be explained hereinafter. As illustrated in FIG. 6, apparatus 100 of the third embodiment is provided as a numerical control machine tool, i.e., a NC machine tool, which forms microscopic recesses on a circumferential surface of a cylinder bore of a cylinder block as a workpiece of an engine for automobiles. Apparatus 100 includes main shaft head 102 moveable in a vertical direction and main shaft 103 that is supported on main shaft head 102 to downwardly project therefrom. Apparatus 100 further includes support platform 104 disposed below main shaft head 102, and tool holder 10 that is disposed coaxially with main shaft 103 and rotatable about central axis L1 together therewith. Support platform 104 is moveable in two directions that extend perpendicular to each other in a horizontal plane. A cylinder block as a workpiece is retained on support platform 4. Tool holder 10 is detachably mounted to main shaft 103 by using an automatic tool interchange device, not shown. Apparatus 100 further includes control unit 108 that controls operations of main shaft head 102, main shaft 103 and support platform 104.

As illustrated in FIG. 5, tool holder 10 is placed within cylinder bore B of cylinder block CB under condition that central axis L1 thereof is in alignment with central axis L2 of cylinder bore B. Tool holder 10 includes shank 10A mounted to main shaft 103, body 10B continuously connected with shank 10A, and housing 10D connected to a lower surface of body 10B via adapter 10C.

Form roller 12 and form roller drive 13 as explained later are mounted to housing 10D of tool holder 10 through form roller support 11. Adapter 10C and housing 10D of tool holder 10 are moveable together with form roller support 11, form roller 12 and form roller drive 13 to advance into cylinder bore B and retreat therefrom along central axis L2. Adapter 10C includes a built-in transport mechanism equipped with a driver, such as a stepping motor, not shown. The transport mechanism of adapter 10C operates housing 10D, form roller support 11, form roller 12 and form roller drive 13 to cause a unitary motion relative to circumferential surface Ba of cylinder bore B in a direction perpendicular to central axis L1 of tool holder 10, namely, in a radial direction of cylinder bore B. Housing 10D has a cylindrical hollow body that is open at one end thereof and has a central axis extending perpendicular to central axis L1 of tool holder 10. Spline nut 15 is fixedly fitted into hollow housing 10D in axial alignment therewith.

Form roller support 11 is in the form of a spline shaft and meshed with spline nut 15 in housing 10D. Form roller support 11 is thus disposed to be moveable in the direction perpendicular to central axis L1 of tool holder 10, namely, in the radial direction of cylinder bore B. Form roller support 11 has one axial end connected with form roller drive 13 that carries form roller 12. Form roller support 11 thus supports form roller drive 13 and form roller 12 so as to move close to circumferential surface Ba of cylinder bore B and apart therefrom.

Form roller 12 is mounted to support shaft 14 that downwardly extends from form roller drive 13. Form roller 12 is rotatable about rotation axis L3 that extends through support shaft 14. Rotation axis L3 is offset from central axis L1 of tool holder 10 in parallel relation thereto. Form roller 12 has a diameter smaller than a diameter of cylinder bore B of cylinder block CB. Form roller 12 is operative to form microscopic recesses on circumferential surface Ba that defines cylinder bore B of cylinder block CB. Form roller 12 may be made of a suitable material, for instance, cemented carbide, hard metal, alumina, ceramic such as silicon nitride, and the like. Form roller 12 has high rigidity and toughness such that even in a case where the workpiece is made of high hardness material such as hardened steel, microscopic recesses can be formed on a surface of the workpiece. Microscopic projections are formed on an outer peripheral surface of form roller 12 in a circumferentially equidistant relation to one another. The microscopic projections may have a height of about 100 μm and be configured to form dimple-shaped microscopic recesses that have a diameter of a few or several tens of μm on circumferential surface Ba of cylinder bore B.

Form roller drive 13 includes a drive source, not shown, such as a built-in motor or reduction gear, and an output shaft connected with the drive source which serves as support shaft 14. Form roller drive 13 drives form roller 12 to rotate about rotation axis L3.

Load applying member 16 is installed in housing 10D of tool holder 10 and applies a load to form roller 12 through form roller drive 13 such that form roller 12 is pressed against circumferential surface Ba of cylinder bore B. Specifically, load applying member 16 biases form roller drive 13 in the radial direction of cylinder bore B to thereby generate the load capable of pressing form roller 12 against circumferential surface Ba of cylinder bore B. In this embodiment, load applying member 16 is a compression coil spring. Load detector 17 that detects the load applied to form roller 12 is disposed adjacent to load applying member 16 within housing 10D of tool holder 10. In this embodiment, load detector 17 is in the form of a piezoelectric load cell. Thus, load applying member 16 and load detector 17 are accommodated within housing 10D of tool holder 10, serving for providing a simple and compact construction of apparatus 100 of this embodiment.

Stop 18 is fixed to an opposite axial end of form roller support 11 which is located within housing 10D of tool holder 10. Stop 18 has a diameter larger than that of form roller support 11. Stop 18 limits expansion of the compression coil spring as load applying member 16 and dampens impact force caused when the compression coil spring expands to maximum, to thereby prevent form roller support 11 from falling off from housing 10D. Although FIG. 5 shows a mutual overlapping state of form roller support 11 and load applying member 16, form roller support 11 and load applying member 16 actually are placed offset from each other without interference therebetween.

Rotation angle detector R1 that detects a rotation angle of form roller 12 is provided on an upper end portion of form roller drive 13. Rotation angle detector R2 that detects a rotation angle of tool holder 10 is provided on a lower end portion of main shaft 103. Each of rotation angle detectors R1 and R2 is preferably a rotary encoder. By using the rotary encoder, apparatus 100 of this embodiment can be more simplified and improved in accuracy of the detection.

Main shaft 103 acts as a rotary drive that causes a relative rotation of cylinder block CB as the workpiece and tool holder 10 about central axis L2 of cylinder bore B. In this embodiment, main shaft 103 drives tool holder 10 to rotate about central axis L2 of cylinder bore B. Main shaft head 102 acts as an axial drive that causes a relative axial movement of cylinder block CB as the workpiece and tool holder 10 along central axis L2 of cylinder bore B. In this embodiment, main shaft head 102 drives tool holder 10 to move along central axis L2 of cylinder bore B. Adapter 10C of tool holder 10 acts as a radial drive that causes a relative radial movement of cylinder block CB as the workpiece and form roller 12 in the radial direction of cylinder bore B. In this embodiment, adapter 10C drives form roller 12 to move in the radial direction of cylinder bore B. As well as the operation of main shaft head 102, main shaft 103, support platform 104, form roller drive 13 and adapter 10C, feed-back control thereof is conducted by control unit 108 on the basis of detection signals that are transmitted from rotation angle detectors R1 and R2.

A method of forming microscopic recesses on circumferential surface Ba that defines cylinder bore B by using apparatus 100 of this embodiment will be explained hereinafter. First, cylinder block CB set on support platform 104 is placed in a position in which central axis L1 of tool holder 10 is in alignment with central axis L2 of cylinder bore B. Subsequently, main shaft head 102 drives main shaft 103 with tool holder 10 to downwardly move such that form roller 12 is advanced into cylinder bore B.

Next, adapter 10C of tool holder 10 is operated to drive form roller 12 to move in the radial direction of cylinder bore B such that the outer peripheral surface of form roller 12 comes into contact with circumferential surface Ba that defines cylinder bore B. Form roller 12 is then placed in a position in which the outer peripheral surface of form roller 12 presses against circumferential surface Ba and the load detected by load detector 17 reaches a preset value. Specifically, the radial movement of form roller 12 is continued by adapter 10C after contacting the outer peripheral surface of form roller 12 with circumferential surface Ba, load applying member 16 is compressed between form roller drive 13 and housing 10D to cause a reaction force that is applied to form roller 12. The reaction force is detected as the load by load detector 17. By continuing the radial movement of form roller 12 until the load detected reaches the preset value, the outer peripheral surface of form roller 12 presses against circumferential surface Ba of cylinder bore B by the load of the preset value to thereby determine the depth of the microscopic recesses formed on circumferential surface Ba.

Subsequently, while pressing the outer peripheral surface of form roller 12 against circumferential surface Ba of cylinder bore B, main shaft 103 and form roller drive 13 are operated so as to synchronize rotation of tool holder 10 about central axis L2 of cylinder bore B and rotation of form roller 12 about rotation axis L3. At this time, the rotation angle of form roller 12 and the rotation angle of tool holder 10 are detected and monitored by rotation angle detectors R1 and R2.

Figure 7:
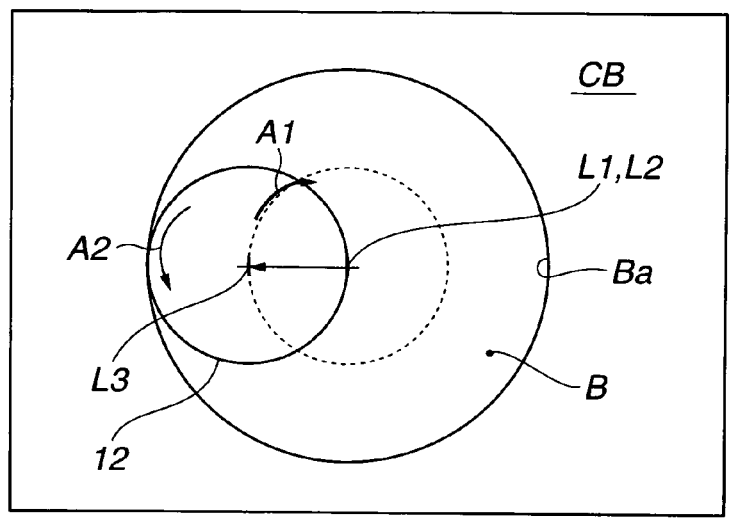
FIG. 7 is a schematic plan view of a form roller of the apparatus of the third embodiment and a cylinder bore of a cylinder block of an engine, which illustrates an operation of the form roller upon forming microscopic recesses

Referring to FIG. 7, the rotation of form roller 12 about rotation axis L3 and the turning thereof around central axis L2 of cylinder bore B are explained. When tool holder 10 is rotated about central axis L1 aligned with central axis L2 of cylinder bore B, form roller 12 turns around central axis L2 of cylinder bore B in direction A1 as illustrated in FIG. 7. At the same time, form roller 12 rotates about rotation axis L3 in direction A2 opposite to direction A1. By thus synchronizing the rotation of tool holder 10 and the rotation of form roller 12, form roller 12 turns around central axis L2 of cylinder bore B and rolls on circumferential surface Ba of cylinder bore B to thereby form microscopic recesses on circumferential surface Ba while preventing slippage between circumferential surface Ba and the outer peripheral surface of form roller 12.

Further, when in combination with the above-described operation, main shaft head 102 drives tool holder 10 to gradually downwardly move and keep advancement of form roller 12 into cylinder bore B, form roller 12 makes a spiral trail along circumferential surface Ba of cylinder bore B and continuously forms the microscopic recesses on circumferential surface Ba. Thus, the microscopic recesses can be formed over a predetermined axial region along central axis L2 of cylinder bore B.

Here, if form roller 12 rolls on circumferential surface Ba of cylinder bore B without slippage under condition that an outer diameter of form roller 12 is 30 mm, the number of microscopic projections of form roller 12 is 100, and a diameter of cylinder bore B is 60 mm, the number of microscopic recesses formed on circumferential surface Ba per turn of form roller 12 about central axis L2 of cylinder bore B is 200. Since a ratio of the diameter of cylinder bore B to the outer diameter of form roller 12 is 60:30, form roller 12 is rotated about rotation axis L3 by two turns while turning about central axis L2 of cylinder bore B, namely, while tool holder 10 is rotated about central axis L2 of cylinder bore B by one turn. That is, if tool holder 100 is rotated about rotation axis L1 by one turn, form roller 12 can be rotated about rotation axis L3 by two turns. Specifically, if tool holder 10 is rotated about rotation axis L1 by 0.5 degree, form roller 12 can be rotated about rotation axis L3 by 1 degree.

Figure 8A:
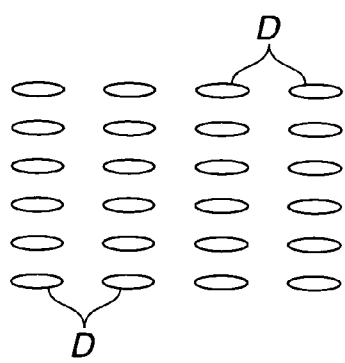
FIGS. 8A and 8B are diagrams that illustrate different patterns of the microscopic recesses formed by the apparatus of the third embodiment of the present invention, respectively.

In apparatus 100 of this embodiment, while the outer peripheral surface of form roller 12 is kept pressing against circumferential surface Ba of cylinder bore B by load applying member 16, the rotation of tool holder 10, the rotation of form roller 12, and the downward movement of form roller drive 13 with form roller 12 are synchronized, and the respective rotation angles of form roller 12 and tool holder 10 are detected as described above. As a result, a regular pattern of the microscopic recesses can be formed over a wide region of circumferential surface Ba of cylinder bore B with increased accuracy and efficiency. FIG. 8A illustrates the regular pattern of microscopic recesses D which are in alignment with one another in both a vertical direction and a lateral direction perpendicular to the vertical direction.

Further, if the number of microscopic recesses formed on circumferential surface Ba of cylinder bore B is set to 200.5, form roller 12 will be rotated about rotation axis L3 by two turns plus 1.8 degrees, while tool holder 10 is rotated about rotation axis L1 by one turn. Namely, because an angular pitch between the microscopic projections of form roller 12 is 3.6 degrees (360 degrees/100 microscopic projections), the rotation angle of form roller 12 is 721.8 degrees, while the rotation angle of tool holder 10 is 360 degrees. Accordingly, the rotation angle of tool holder 10 relative to 1 degree of the rotation angle of form roller 12 is 0.498 degree as calculated by dividing 360 degrees by 721.8 degrees.

Figure 8B:
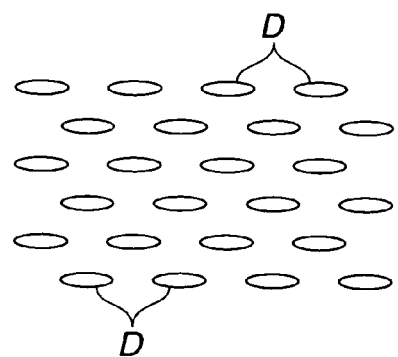

By thus synchronizing the rotation of tool holder 10, the rotation of form roller 12, and the downward movement of form roller drive 13 with form roller 12, an offset pattern of the microscopic recesses as shown in FIG. 8B can be formed over a wide region of circumferential surface Ba of cylinder bore B with increased accuracy and efficiency. In FIG. 8B, microscopic recesses D are offset from one another in the vertical direction.

Figure 9:
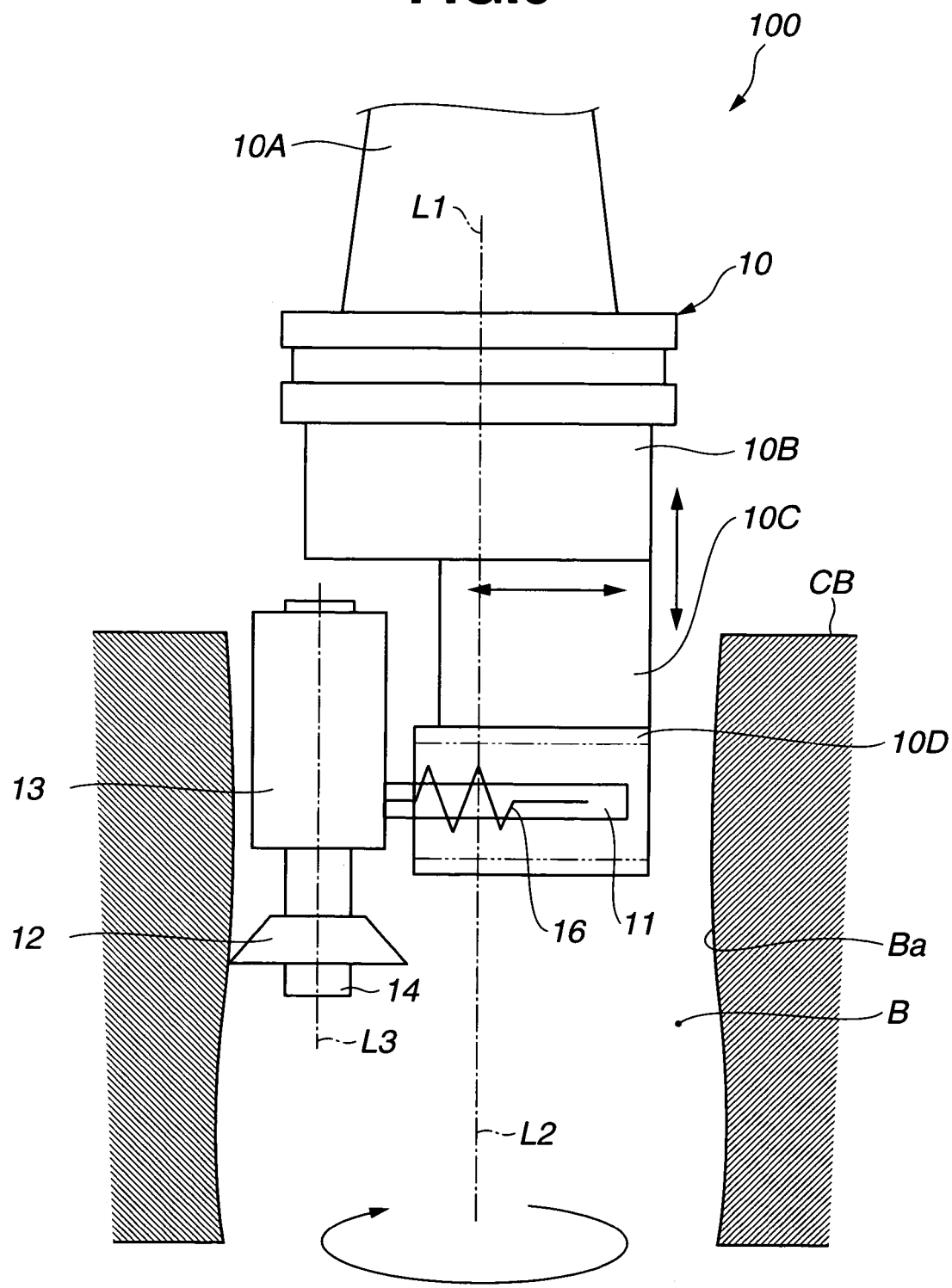
FIG. 9 is a view similar to FIG. 5, but shows the cylinder bore that has an error in diameter.
Figure 10A:
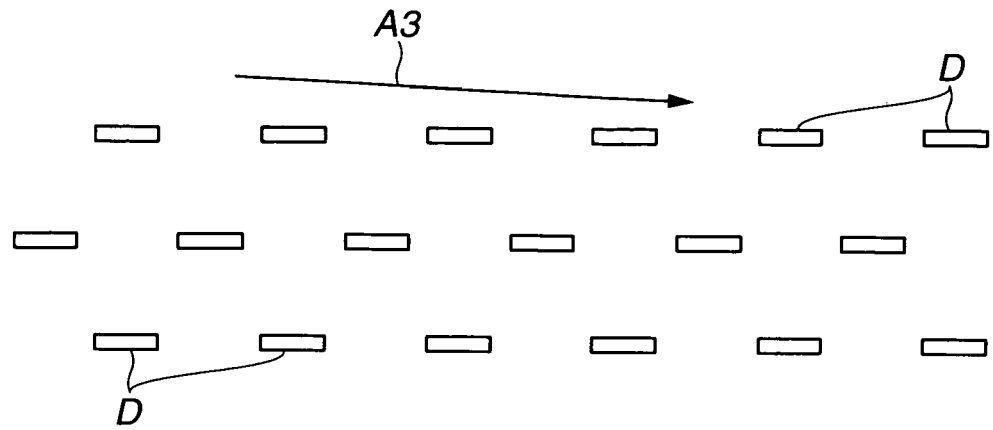
FIGS. 10A-10C are diagrams that illustrate different patterns of the microscopic recesses formed on circumferential surfaces of the cylinder bores that have a uniform diameter, a gradually increased diameter and a gradually reduced diameter, respectively.

FIG. 9 illustrates cylinder bore B of cylinder block CB which has an error in diameter, roundness or cylindricity by boring before formation of microscopic recesses. In FIG. 9, the error is emphasized for easy understanding. When the microscopic recesses are formed on circumferential surface Ba of cylinder bore B that has a diameter identical to the preset value, the microscopic recesses are regularly formed along a spiral trail of the rolling motion of form roller 12. FIG. 10A shows microscopic recesses D that are formed in direction A3 of the rolling motion of the form roller on circumferential surface Ba of cylinder bore B that has a diameter of the preset value.

Figure 10B:
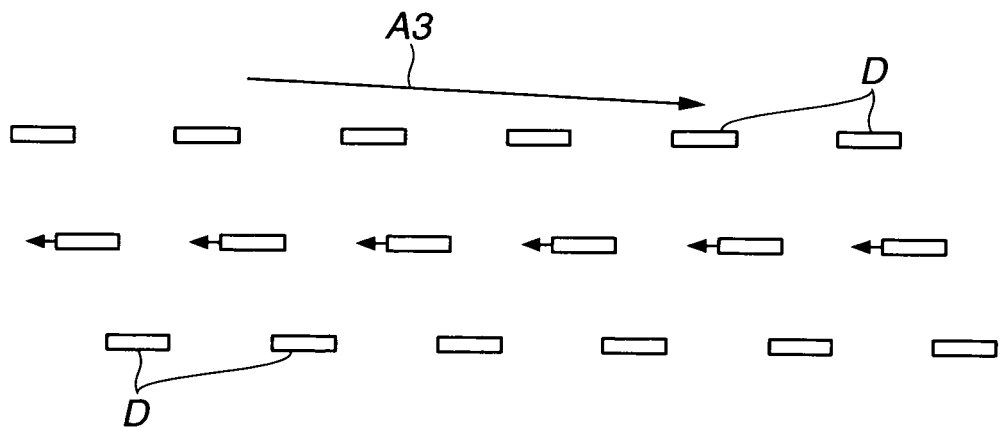
Figure 10C:
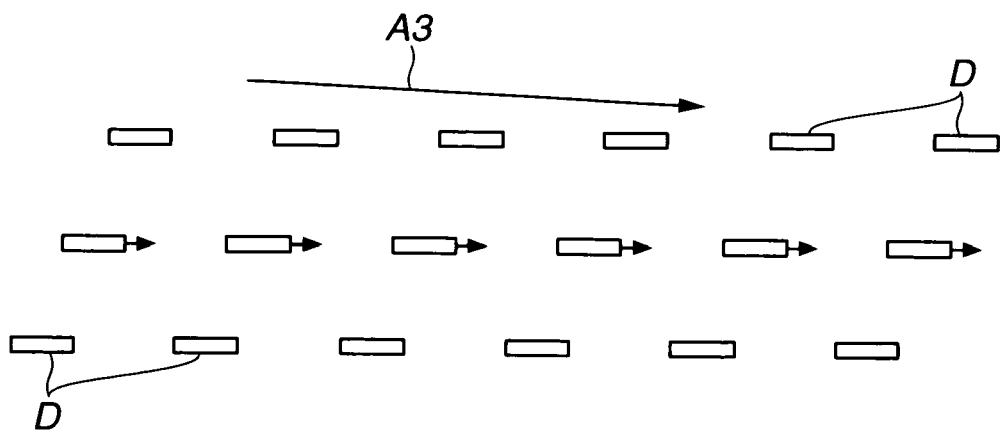

FIG. 10B illustrates microscopic recesses D formed on circumferential surface Ba of cylinder bore B that has a gradually increased diameter. As shown in FIG. 10B, a row of microscopic recesses D formed at a second turn and the subsequent turns of form roller 12 is offset from a row of microscopic recesses D formed at a first turn of form roller 12, along a direction opposite to direction A3 of the rolling motion of form roller 12. In contrast, FIG. 10C illustrates microscopic recesses D formed on circumferential surface Ba of cylinder bore B that has a gradually reduced diameter. As shown in FIG. 10C, a row of microscopic recesses D formed at a second turn and the subsequent turns of form roller 12 is offset from a row of microscopic recesses D formed at a first turn of form roller 12, along direction A3 of the rolling motion of form roller 12.

Even when cylinder bore B of cylinder block CB has an error in diameter, roundness or cylindricity as explained above, in apparatus 100 of this embodiment, the rotation of form roller 12 driven by form roller drive 13 and the rotation of tool holder 10 driven by main shaft 103 can be synchronized, and the rotation angle of tool holder 10 and the rotation angle of form roller 12 can be controlled so as to maintain a predetermined relation therebetween. Therefore, microscopic recesses that have less dispersion in depth can be regularly formed without considerable change of the previous boring work with respect to control of diameter, roundness and cylindricity. This serves for facilitating the previous boring work.

Further, apparatus 100 of this embodiment can form the microscopic recesses on circumferential surface Ba that defines cylinder bore B by using form roller 12 without need of the disposable masking sheet as conventionally used. This enables efficient formation of the microscopic recesses with high accuracy and realizes further improvement of productivity and more saving of the production costs.

Further, in apparatus 100 of this embodiment, while form roller 12 is biased by load applying member 16 to press the outer peripheral surface of form roller 12 against circumferential surface Ba that defines cylinder bore B, the rotation of tool holder 10 and the rotation of form roller 12 are synchronized. The microscopic recesses, therefore, can be regularly formed with high accuracy while preventing slippage that may be caused between form roller 12 and circumferential surface Ba, even when the material of cylinder block CB is different from that of form roller 12 or the depth of the microscopic recesses are varied, and even when cylinder bore B of cylinder block CB has an error in diameter, roundness and cylindricity.

Further, with use of rotation angle detectors R1 and R2, the slippage caused between form roller 12 and circumferential surface Ba that defines cylinder bore B can be monitored during formation of the microscopic recesses. This serves for forming the microscopic recesses with further enhanced accuracy.

Further, adapter 10C of tool holder 10 serves as the radial drive for moving form roller 12 relative to circumferential surface Ba in the radial direction of cylinder bore B. Therefore, the pressing force of form roller 12 against circumferential surface Ba can be readily varied to thereby change the depth of the microscopic recesses during formation thereof. This can form the microscopic recesses that have a depth as required on circumferential surface Ba.

Further, with use of the compression coil spring as load applying member 16, the construction of apparatus 100 of this embodiment can be simplified and apply a sufficient load to form roller 12. Alternatively, an actuator may be used as both load applying member 16 and the radial drive for form roller 12, i.e., adapter 10C. In such a case, the actuator per se can change the load, and also can further simplify the construction of apparatus 100 of this embodiment.

Further, with use of the load cell as load detector 17, apparatus 100 of this embodiment can accurately detect the load applied to form roller 12 with the simple construction. Furthermore, feed-back control of adapter 10C as the radial drive for form roller 12 can be performed using the detection signal from the load cell. This can control the load applied to form roller 12 such that the microscopic recesses have a constant depth. In addition, the load applied to form roller 12 can be controlled to gradually vary the depth of the microscopic recesses or locally change the depth thereof such that the depth thereof is varied in different areas of circumferential surface Ba that defines cylinder bore B.

The microscopic recesses formed by using apparatus 100 of this embodiment can serve as oil retention portions on circumferential surface Ba that defines cylinder bore B of cylinder block CB. The microscopic recesses as oil retention portions can effectively reduce friction that is caused between circumferential surface Ba and an outer peripheral surface of a piston as a counterpart. This can serve for enhancing a performance of the engine.

Further, in apparatus 100 of this embodiment, the relative rotation of tool holder 10 and cylinder block CB as the workpiece, as well as the relative axial movement thereof are caused by moving tool holder 10 relative to cylinder block CB, and the relative radial movement of form roller 12 and cylinder block CB is caused by moving form roller 12 relative to cylinder block CB. However, the relative rotation of tool holder 10 and cylinder block CB and the relative axial movement thereof may be performed by rotationally and axially moving cylinder block CB, or by rotationally and axially moving both tool holder 10 and cylinder block CB. The relative radial movement of form roller 12 and cylinder block CB may be performed by radially moving cylinder block CB, or by radially moving both form roller 12 and cylinder block CB.

Furthermore, similar to the first and second embodiments, the apparatus and method of the third embodiment can be used for forming microscopic recesses on a circumferential surface that defines a cylindrical bore of various kinds of members as a workpiece.

Referring to FIGS. 11-14, a fourth embodiment of the apparatus and method of the present invention will be explained hereinafter. Similar to the third embodiment, as illustrated in FIG. 6, apparatus 200 of the fourth embodiment is provided as a NC machine tool that forms microscopic recesses on a circumferential surface of a cylinder bore of a cylinder block as a workpiece of an engine for automobiles. Like reference numerals denote like parts, and therefore, detailed explanations therefor are omitted.

Figure 11:
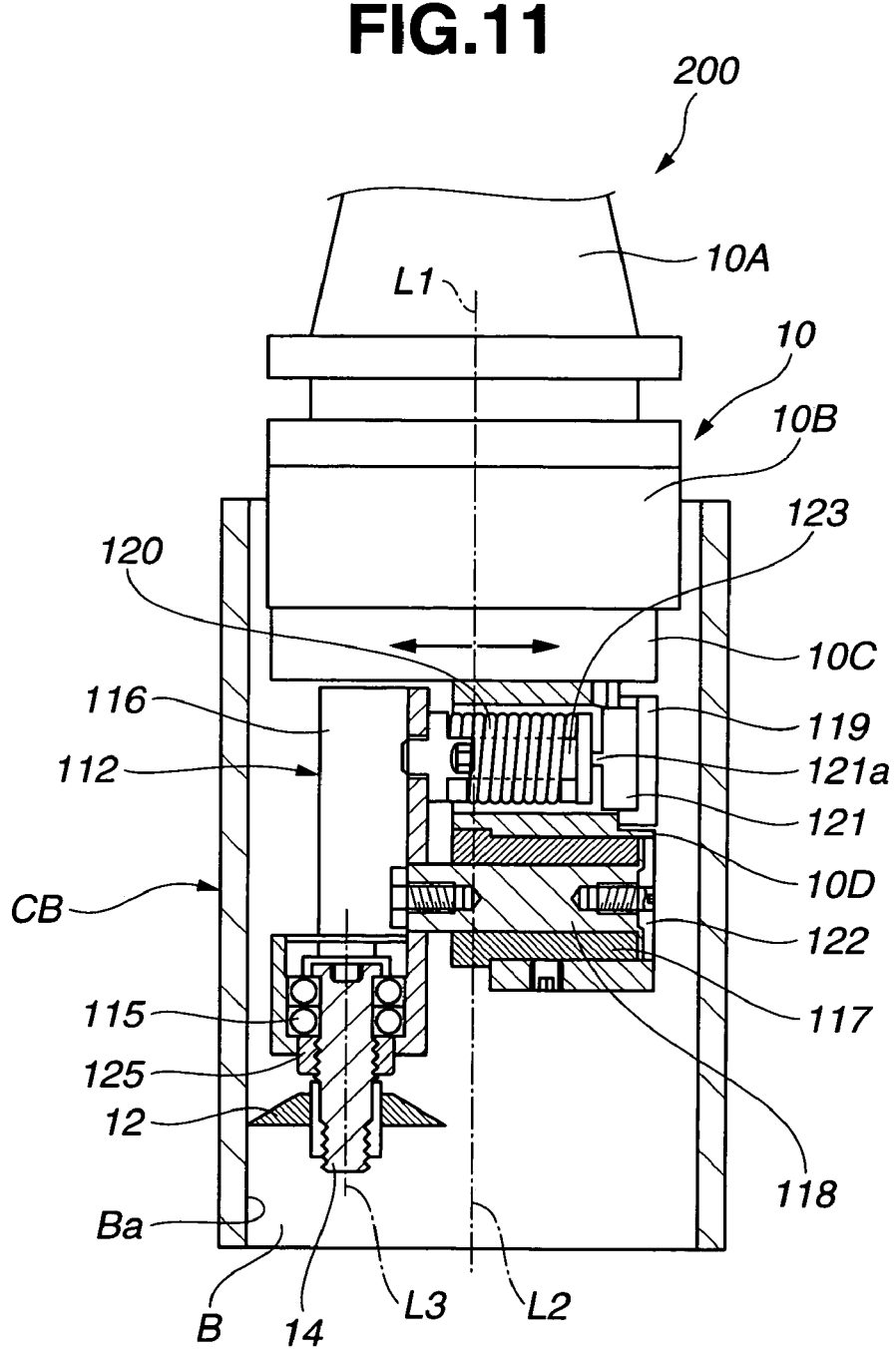
FIG. 11 is a vertical cross-section of an apparatus according to a fourth embodiment of the present invention.
Figure 12:
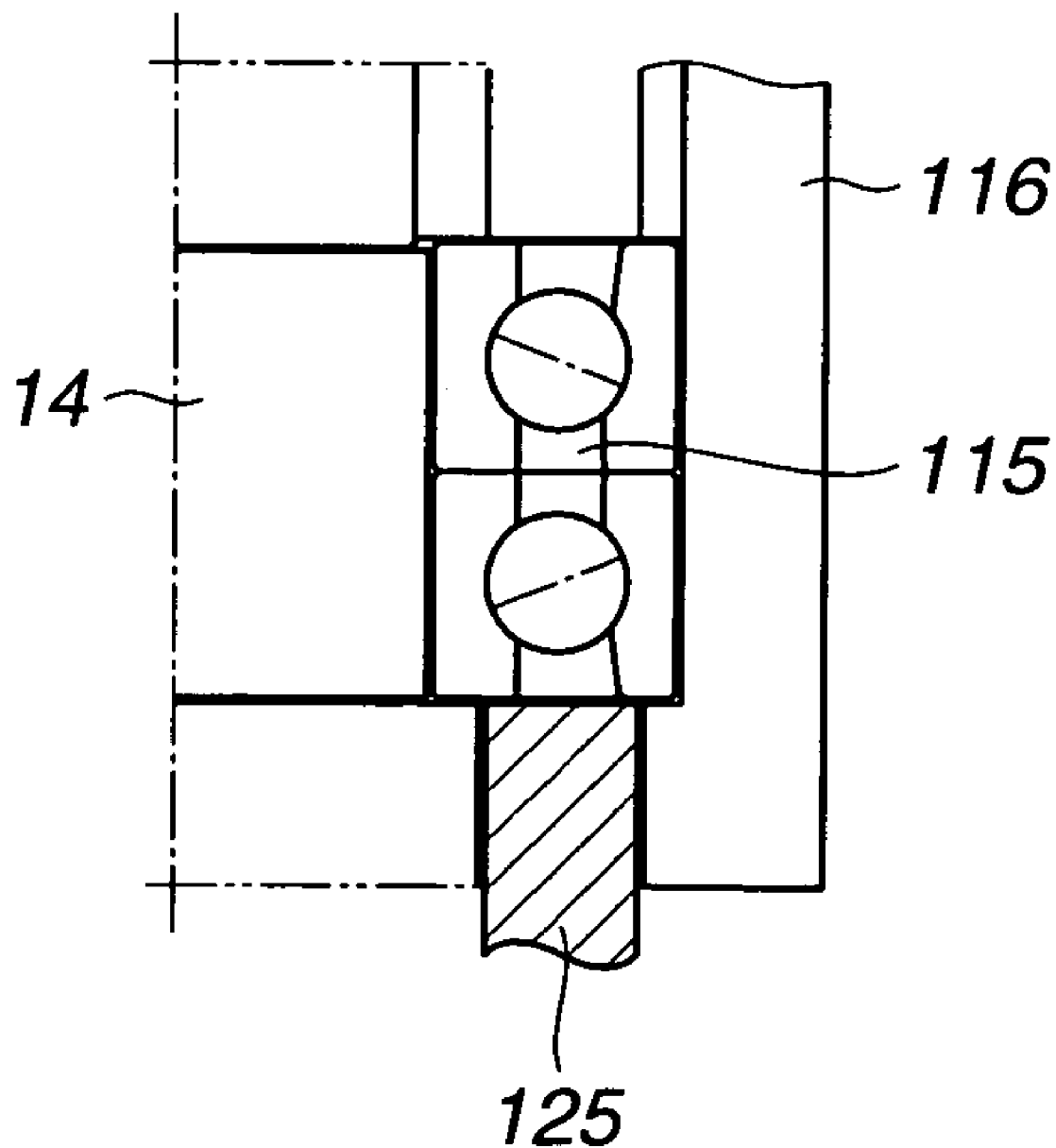
FIG. 12 is an enlarged partial view of FIG. 11 and shows a combined angular contact ball bearing used in the apparatus of the fourth embodiment of the present invention.

As illustrated in FIG. 11, form roller support 112 is mounted on housing 10D of tool holder 10 through a spline coupling as described later. Form roller support 112 is in the form of an arm and includes support shaft 14 to which form roller 12 is fixed, and support member 116 on which support shaft 14 is rotatably supported through combined angular contact ball bearing 115 as shown in FIG. 12. Support shaft 14 is offset from main shaft 103 and parallel thereto.

Rotational resistance varying member 125 that varies rotational resistance of form roller 12 is disposed on a lower side of combined angular contact ball bearing 115. In this embodiment, rotational resistance varying member 125 is in the form of a bearing set screw. By varying a clamping degree of the bearing set screw as rotational resistance varying member 125, a pre-load applied to combined angular contact ball bearing 115 is controlled so that the rotational resistance of support shaft 14, namely, the rotational resistance of form roller 12 can be varied.

The spline coupling between housing 10D of tool holder 10 and form roller support 112 is formed by spline nut 117 fitted into hollow housing 10D and spline shaft 118 that is connected at one axial end thereof with support member 116 of form roller support 112 and meshed with spline nut 117. Specifically, housing 10D includes a lower hollow portion into which spline nut 117 is fixedly fitted. With the spline coupling between spline nut 117 and spline shaft 118, form roller support 112 is moveable together with form roller 12 in the direction perpendicular to rotation axis L1 of tool holder 10 and main shaft 103, namely, in a radial direction of cylinder bore B of cylinder block CB.

Housing 10D of tool holder 10 further includes an upper hollow portion to which cap 119 is fitted. Load applying member 120 and load detector 121 are disposed between cap 119 and support member 116 of form roller support 112. Load applying member 120 applies a load to support member 116 in the direction perpendicular to main shaft 103, namely, in the radial direction of form roller 12. Owing to the application of the load, the microscopic projections on the outer peripheral surface of form roller 12 is pressed against circumferential surface Ba that defines cylinder bore B under condition that rotation axis L1 of tool holder 10 and central axis L2 of cylinder bore B are in alignment with each other. In this embodiment, a compression coil spring is used as load applying member 120.

Load detector 121 that detects the load applied to support member 116 of form roller support 112 is disposed between cap 119 and load applying member 120. In this embodiment, load detector 121 is in the form of a piezoelectric load cell. Thus, center of gravity of the functional parts that includes form roller 12, form roller support 112, housing 10D of tool holder 10 and load applying member 120 is placed on a side of form roller 12 with respect to rotation axis L1 of tool holder 10.

Stop 122 is fixedly disposed in the lower hollow portion of housing 10D on a side of an opposite axial end of spline shaft 118. Stop 122 has a diameter larger than spline shaft 118 and is made of a suitable soft material such as urethane resin. Stop 122 serves for limiting expansion of the compression coil spring as load applying member 120 and dampening impact caused when the compression coil spring expands to maximum, to thereby prevent form roller support 112 from falling off from housing 10D.

Load adjuster 123 for applying a pre-load to load applying member 120 is disposed between load applying member 120 and load detector 121. The pre-load is controlled by selecting a length of load adjuster 123, that is, a length of the compression coil spring as load applying member 120 in a direction of the expansion motion. Load detector 121 has spherical projection 121a contacted with load adjuster 123. With the provision of spherical projection 121a, even when the compression coil spring is inclined relative to the expansion direction, load detector 121 can effectively detect the load through spherical projection 121a.

Adapter 10C connected with housing 10D includes a built-in radial drive equipped with a stepping motor, not shown. The radial drive of adapter 10C operates form roller support 112, form roller 12 supported on form roller support 112, and load applying member 120 to cause a unitary motion relative to circumferential surface Ba that defines cylinder bore B in a direction perpendicular to rotation axis L1 of tool holder 10, namely, in the radial direction of cylinder bore B. Thus, form roller 12 can be moved close to circumferential surface Ba and apart therefrom.

A method of forming microscopic recesses on circumferential surface Ba that defines cylinder bore B by using apparatus 200 of this embodiment will be explained hereinafter. First, cylinder block CB is placed on support platform 104 in a position in which rotation axis L1 of tool holder 10, i.e., the central axis thereof is in alignment with central axis L2 of cylinder bore B. Subsequently, main shaft head 102 drives main shaft 103 with tool holder 10 to downwardly move such that form roller 12 is advanced into cylinder bore B.

Next, adapter 10C of tool holder 10 is operated to drive form roller support 112 with form roller 12 to move in the radial direction of cylinder bore B such that the outer peripheral surface of form roller 12 comes into contact with circumferential surface Ba that defines cylinder bore B. Form roller 12 is then placed in a position in which the outer peripheral surface of form roller 12 presses against circumferential surface Ba and the load detected by load detector 121 reaches a preset value. Specifically, when the radial movement of form roller 12 is continued by adapter 10C after contacting the outer peripheral surface of form roller 12 with circumferential surface Ba, load applying member 120 is compressed between support member 116 of form roller support 112 and housing 10D to cause a reaction force that is applied to form roller 12. The reaction force is detected as the load by load detector 121. By continuing the radial movement of form roller 12 until the load detected reaches the preset value, the outer peripheral surface of form roller 12 presses against circumferential surface Ba by the load of the preset value.

Figure 13:
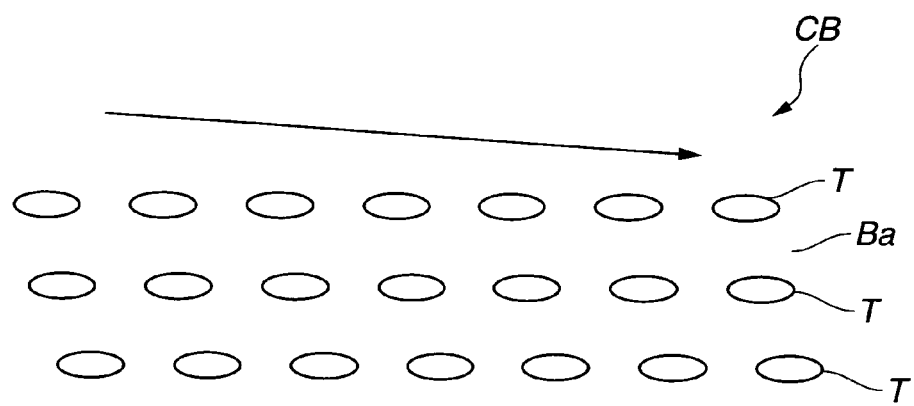
FIGS. 13 and 14 are diagrams that illustrate different patterns of the microscopic recesses formed by the apparatus of the fourth embodiment of the present invention, respectively.

When the load detected by load detector 121 reaches the preset value, the operation of adapter 10C is stopped. Subsequently, while pressing the outer peripheral surface of form roller 12 against circumferential surface Ba, main shaft 103 with tool holder 10 is rotated about rotation axis L1, and at the same time, the downward movement of main shaft head 102 is restarted. When main shaft 103 with tool holder 10 is rotated, support shaft 14 with form roller 12 is caused to rotate about rotation axis L3 and turn around rotation axis L1 together with tool holder 10. By synchronizing the rotation of main shaft 103 and the downward movement of main shaft head 102, form roller 12 rolls on circumferential surface Ba and continuously forms the microscopic recesses on circumferential surface Ba over a predetermined axial region along central axis L2 of cylinder bore B. FIG. 13 illustrates a pattern of thus-formed microscopic recesses T. Microscopic recesses T are along the direction of the rolling motion of form roller 12 as indicated by arrow.

Figure 14:
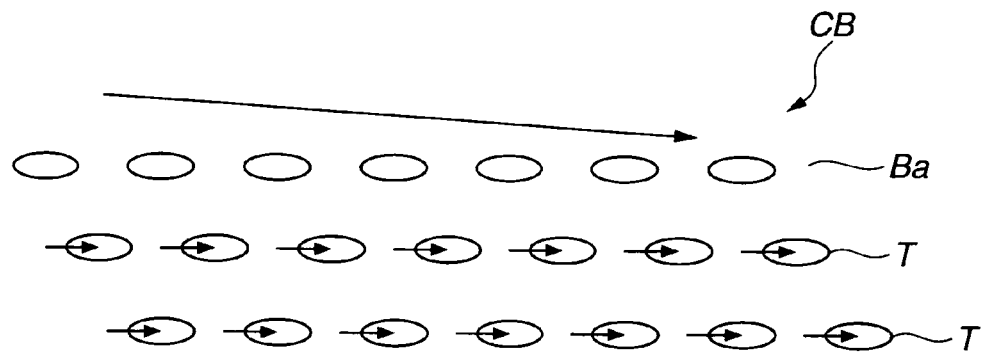

Further, when the clamping degree of the bearing set screw as rotational resistance varying member 125 is varied depending on the material of cylinder block CB and the diameter of cylinder bore B, the pre-load applied to combined angular contact ball bearing 115 can be changed to thereby vary the rotational resistance of form roller 12. This causes change in a slip ratio upon form rolling, so that an offset pattern of microscopic recesses T as shown in FIG. 14 is formed as desired on circumferential surface Ba. In FIG. 14, a row of microscopic recesses T is offset in a direction as indicated by arrows every turn of form roller 12. Thus, the pattern of microscopic recesses T is thus accurately controlled.

When the formation of the microscopic recesses is completed, adapter 10C is operated to move form roller 12 apart from circumferential surface Ba. Subsequently, tool holder 10 supported on main shaft 103 is upwardly moved to remove form roller 12 from cylinder bore B.

As is understood from the above description, apparatus 200 of this embodiment can form the microscopic recesses that have a substantially uniform depth with high accuracy. Therefore, previous works to which circumferential surface Ba defining cylinder bore B is subjected before forming the microscopic recesses can be omitted. This realizes reduction of the number of production steps and the production cost.

Further, in apparatus 200 of this embodiment, the bearing set screw disposed on the lower side of combined angular contact ball bearing 115 serves as rotational resistance varying member 125, and the pre-load applied to combined angular contact ball bearing 115 is controlled by varying the clamping degree of the bearing set screw to thereby vary the rotational resistance of support shaft 14, namely, the rotational resistance of form roller 12. Accordingly, the pattern of the microscopic recesses can be accurately controlled depending on the material of cylinder block CB and the diameter of cylinder bore B.

Further, as form roller 12 rolls on circumferential surface Ba that defines cylinder bore B, the microscopic recesses are formed. This results in considerable reduction of wear of the tools, serving for increase in life of the tools.

Figure 15:
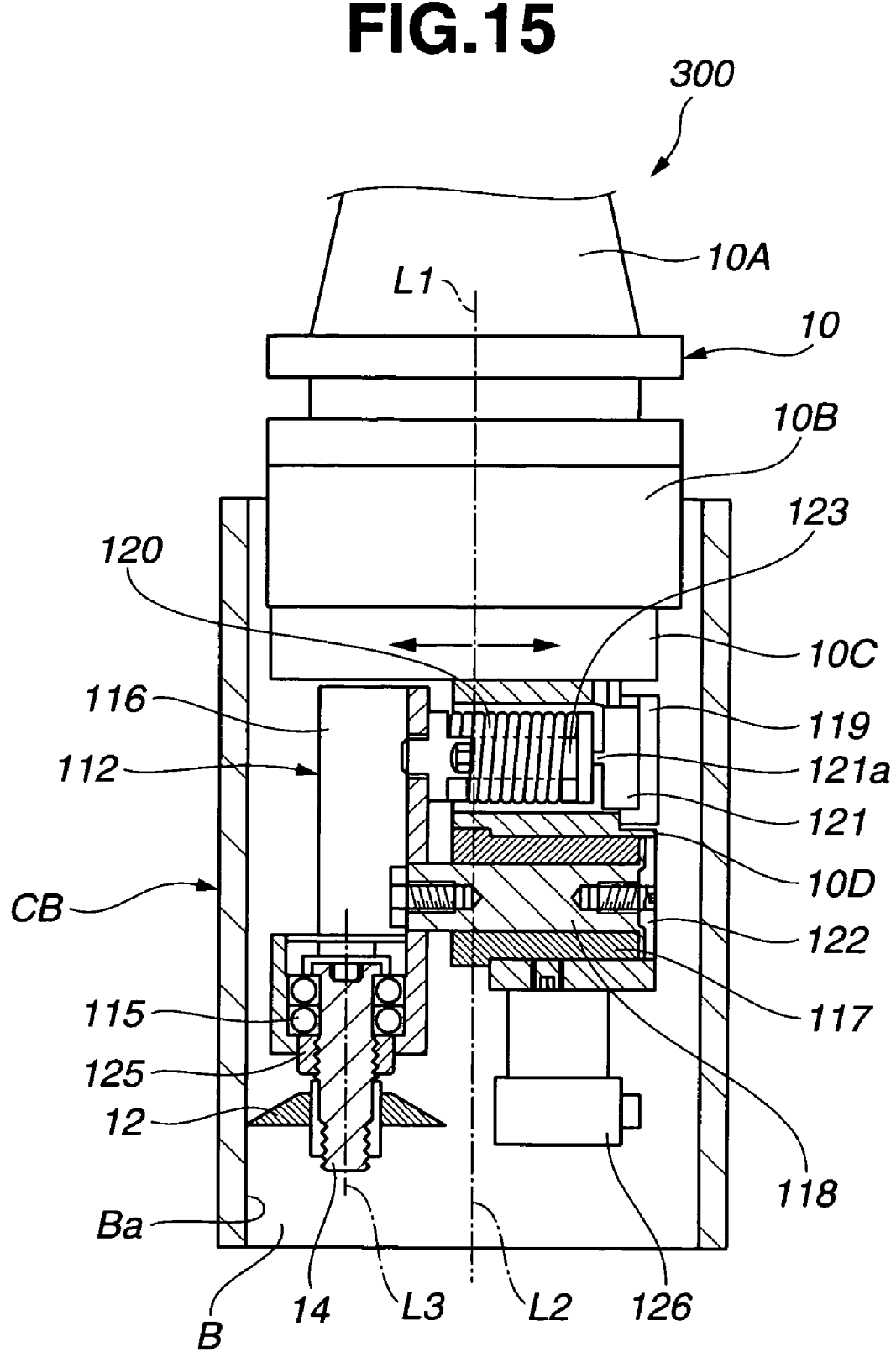
FIG. 15 is a vertical cross-section of an apparatus according to a fifth embodiment of the present invention.

Referring to FIG. 15, there is shown a fifth embodiment of the apparatus of the present invention, which differs from the fourth embodiment in provision of a monitor of a pattern of the microscopic recesses formed. As illustrated in FIG. 15, apparatus 300 of this embodiment includes CCD camera 126 as a monitor which is disposed on housing 10D of tool holder 10. CCD camera 126 monitors the pattern of the microscopic recesses formed on circumferential surface Ba that defines cylinder bore B.

In apparatus 300 of this embodiment, the pattern of the microscopic recesses formed on circumferential surface Ba can be monitored in real time. The microscopic recesses, therefore, can be formed with increased accuracy. In addition, apparatus 300 of this embodiment serves for reduction of the size and the production cost.

Figure 16:
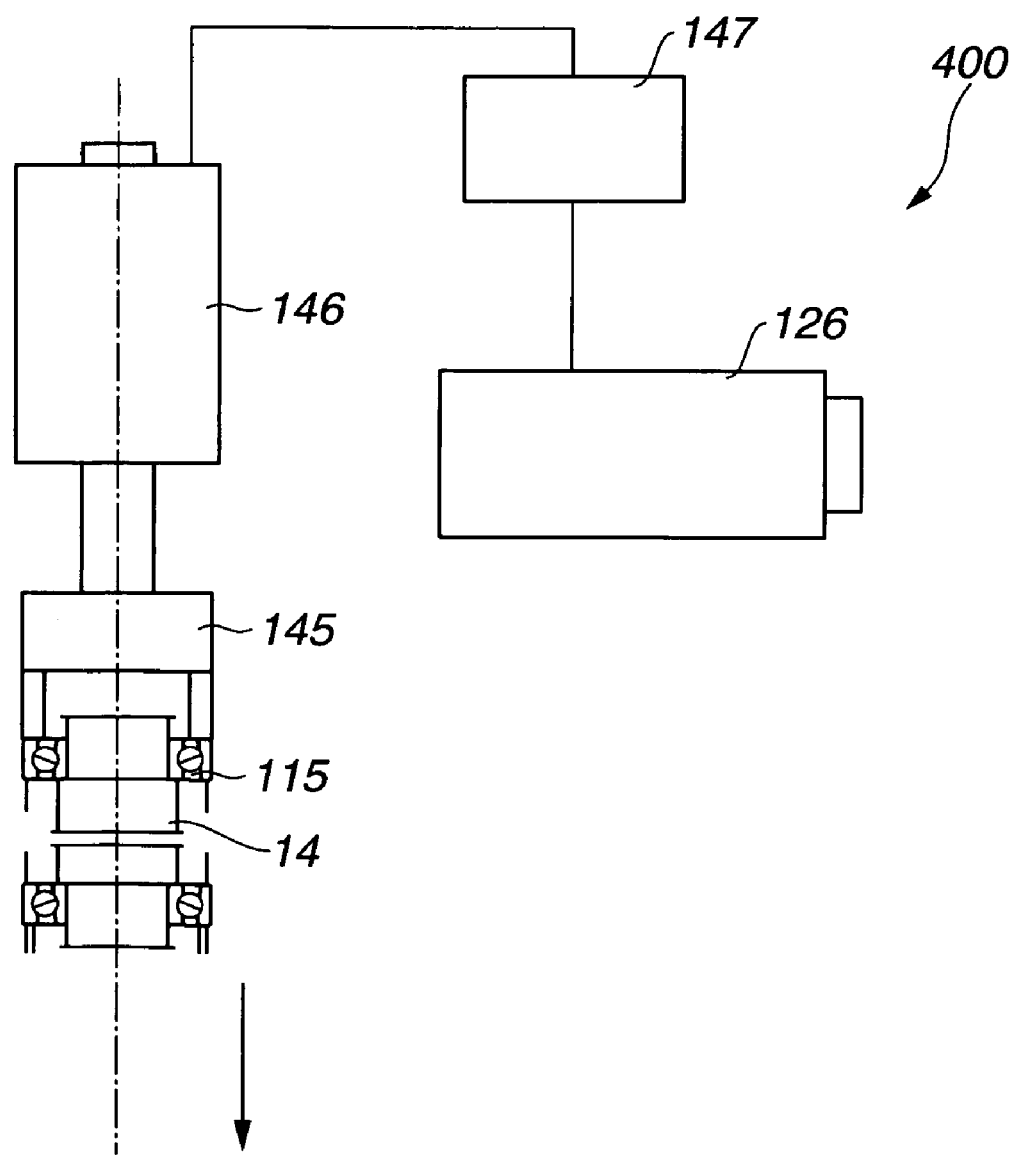
FIG. 16 is a vertical cross-section of an apparatus according to a sixth embodiment of the present invention.

Referring to FIG. 16, there is shown a sixth embodiment of the apparatus of the present invention, which differs from the fifth embodiment in arrangement of the rotational resistance varying member and in provision of a drive source for the rotational resistance varying member and a rotational resistance control unit for operating the drive source. As illustrated in FIG. 16, in apparatus 400 of this embodiment, the bearing set screw as rotational resistance varying member 145 is disposed on an upper side of combined angular contact ball bearing 115. Apparatus 400 of this embodiment further includes drive source 146 that rotates the bearing set screw, and rotational resistance control unit 147 that operates drive source 146 on the basis of the pattern of the microscopic recesses formed which is monitored by CCD camera 126. Drive source 146 is a motor in this embodiment, but may be a rotary actuator.

In apparatus 400 of this embodiment, rotational resistance control unit 147 develops a command to operate drive source 146 on the basis of the pattern of the microscopic recesses monitored by CCD camera 126 during the formation of the microscopic recesses on circumferential surface Ba that defines cylinder bore B. In response to the command from rotational resistance control unit 147, drive source 146 rotates the bearing set screw as rotational resistance varying member 145 to thereby vary the rotational resistance of form roller 12. As a result, the pattern of the microscopic recesses formed on circumferential surface Ba can be automatically controlled.

In apparatuses 100, 200, 300 and 400 of the third through sixth embodiments, the microprojections on the outer peripheral surface of form roller 12 may be configured to various shapes corresponding to the shapes of microscopic recesses to be formed, for instance, a continuous groove-shape and a dotted line-shape.

Further, the compression coil spring as load applying member 120 may be replaced with different ones that are capable of applying different loads in order to vary the load applied to support member 116. Alternatively, an elastic member capable of applying a predetermined load to support member 116 may be used as load applying member 120. A pneumatic or hydraulic actuator also may be used as load applying member 120.

Figure 17:
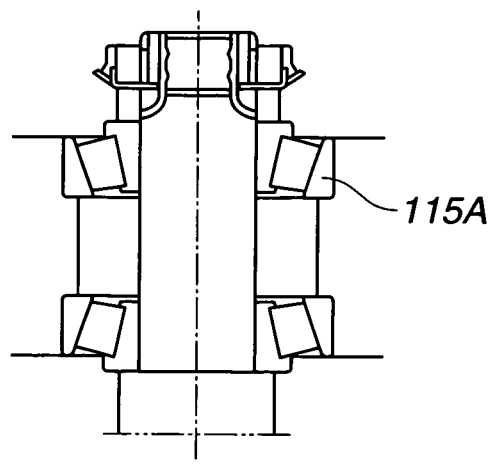
FIGS. 17 and 18 are modifications of the sixth embodiment of the present invention, respectively.

Further, combined angular contact ball bearing 115 may be replaced with tapered roller bearing 115A as illustrated in FIG. 17. Tapered roller bearing 115A may be used in the fourth and fifth embodiments.

Figure 18:
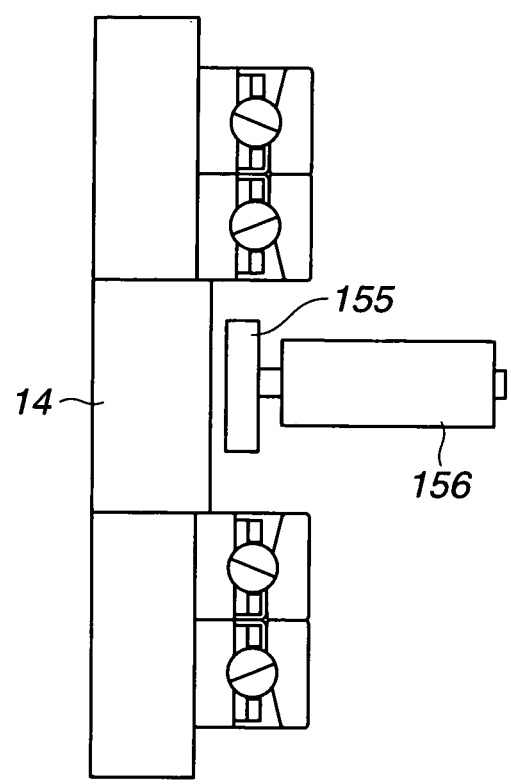

FIG. 18 illustrates a modification of the sixth embodiment. In FIG. 18, friction member 155 is used as the rotational resistance varying member instead of the bearing set screw used as rotational resistance varying member 145 of the sixth embodiment. Friction member 155 is brought into contact with support shaft 14 to thereby increase the rotational resistance of support shaft 14. Drive source 156 is provided, which drives friction member 155 to be in contact with support shaft 14. Drive source 156 is a motor in this modification, but may be an actuator. Friction member 155 and drive source 156 also may be used as the rotational resistance varying member in the fourth and fifth embodiments.

Further, an electromagnetic brake can be used as the rotational resistance varying member that varies the rotational resistance of form roller 12.

Figure 19:
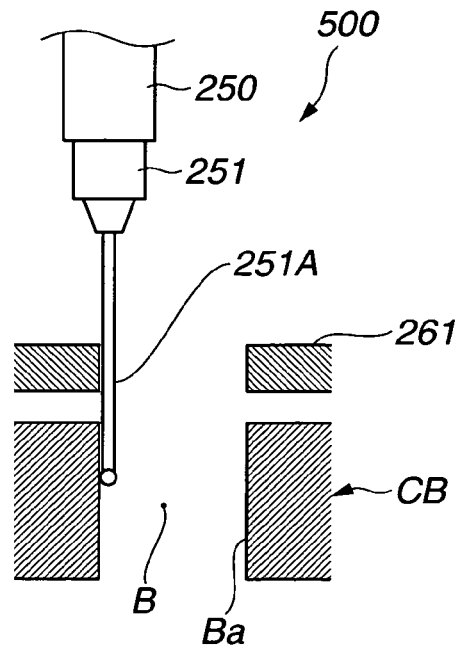
FIG. 19 shows a contact diameter measuring device of a seventh embodiment of the present invention.
Figure 20:
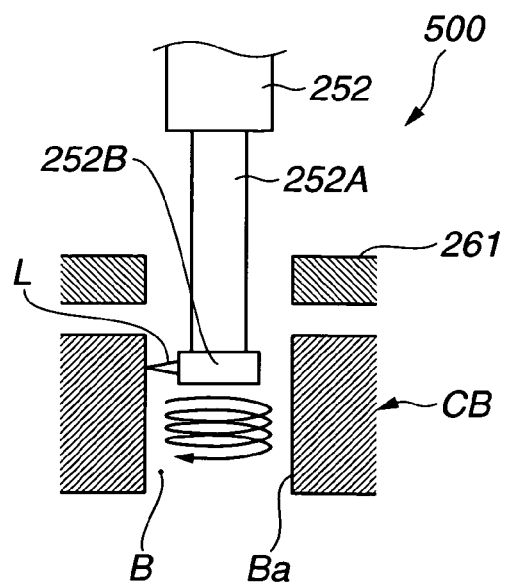
FIG. 20 shows a non-contact diameter measuring device useable in the seventh embodiment of the present invention.

Referring to FIGS. 19-22B, a seventh embodiment of the apparatus of the present invention will be explained hereinafter. Similar to the above-described embodiments, the apparatus of the seventh embodiment is provided as a NC machine tool as shown in FIG. 6 which forms microscopic recesses on a circumferential surface of a cylinder bore of a cylinder block as a workpiece of an engine for automobiles. The seventh embodiment differs from the fourth embodiment as shown in FIG. 11 in provision of a diameter measuring device of measuring a diameter of the cylinder bore. The diameter measuring device may be a contact diameter measuring device as shown in FIG. 19 or a non-contact diameter measuring device as shown in FIG. 20.

As illustrated in FIG. 19, apparatus 500 of this embodiment includes contact diameter measuring device 251 that measures a diameter of cylinder bore B of cylinder block CB with contact 251A as a probe. Contact diameter measuring device 251 is connected with measuring head 250 that is detachably mounted to main shaft 103 of apparatus 500. Contact diameter measuring device 251 includes contact 251A that is brought into contact with circumferential surface Ba that defines cylinder bore B. Diameter measuring device 251 is operated to measure the diameter of cylinder bore B under condition that rotation axis L1 of main shaft 103 and central axis L2 of cylinder bore B are in alignment with each other. Master ring 261 useable as a measurement reference may be arranged in coaxial relation to cylinder bore B by using a frame member, not shown. In such a case, after measuring master ring 261, cylinder bore B is actually measured to calculate the difference between the measured values of cylinder bore B and a bore of master ring 261. The diameter of cylinder bore B is calculated from the difference.

Alternatively, as illustrated in FIG. 20, apparatus 500 includes non-contact diameter measuring device 252 that measures a diameter of cylinder bore B of cylinder block CB by irradiating circumferential surface Ba of cylinder bore B with a laser. Similar to contact diameter measuring device 251, non-contact diameter measuring device 252 is connected with measuring head 250. Non-contact diameter measuring device 252 includes arm 252A downwardly extending and laser-emitting and receiving section 252B that is disposed at an axial end of arm 252A. Laser-emitting and receiving section 252B emits and receives laser L to measure the diameter of cylinder bore B. Non-contact diameter measuring device 252 is operated to measure the diameter of cylinder bore B under condition that rotation axis L1 of main shaft 103 and central axis L2 of cylinder bore B are in alignment with each other. Master ring 261 as the measurement reference may also be used together with non-contact diameter measuring device 252 like contact diameter measuring device 251. Non-contact diameter measuring device 252 is preferably used when a workpiece made of a relatively small hardness material is subjected to formation of microscopic recesses.

Contact diameter measuring device 251 and non-contact diameter measuring device 252 transmit a signal indicative of the measured diameter of cylinder bore B to control unit 108. Control unit 108 receives the signal and controls main shaft head 102 to vary a speed of the relative axial movement of cylinder block CB and tool holder 10 on the basis of the diameter of cylinder bore B. Further, the roundness and the cylindricity of cylinder bore B can be detected by measuring the rotational movement and the axial movement of tool holder 10 using contact diameter measuring device 251 or non-contact diameter measuring device 252.

A method of forming microscopic recesses on circumferential surface Ba that defines cylinder bore B by using apparatus 500 will be explained hereinafter. First, main shaft 103 and cylinder block CB are placed in an axially aligned position in which the rotation axis of main shaft 103 and central axis L2 of cylinder bore B are in alignment with each other. Next, contact diameter measuring device 251 or non-contact diameter measuring device 252 is attached to main shaft 103 and operated to measure the diameter of cylinder bore B. After completion of the measurement, main shaft head 102 is operated to upwardly move main shaft 103, and then contact diameter measuring device 251 or non-contact diameter measuring device 252 is replaced with tool holder 10, and tool holder 10 mounted to main shaft 103 is downwardly moved such that form roller 12 is advanced into cylinder bore B.

Next, adapter 10C of tool holder 10 is operated to drive form roller support 112 with form roller 12 to move in the radial direction of cylinder bore B such that the outer peripheral surface of form roller 12 comes into contact with circumferential surface Ba that defines cylinder bore B. The outer peripheral surface of form roller 12 is then pressed against circumferential surface Ba until the load detected by load detector 121 reaches a preset value. Specifically, when the radial movement of form roller 12 is continued by adapter 10C after contacting the outer peripheral surface of form roller 12 with circumferential surface Ba, load applying member 120 is compressed between support member 116 of form roller support 112 and housing 10D to cause a reaction force that is applied to form roller 12. The reaction force is detected as the load by load detector 121. By continuing the operation of adapter 10C until the load detected reaches the preset value, the outer peripheral surface of form roller 12 presses against circumferential surface Ba by the load of the preset value. The depth of microscopic recesses is thus determined.

Figure 21:
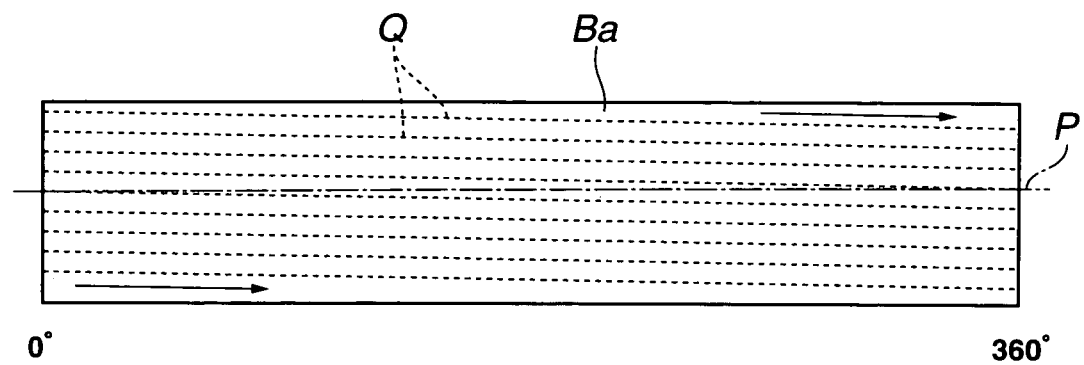
FIG. 21 is a diagram that illustrates a pattern of the microscopic recesses formed by the apparatus of the seventh embodiment of the present invention.

When the load detected by load detector 121 reaches the preset value, the operation of adapter 10C is stopped. Subsequently, while pressing the outer peripheral surface of form roller 12 against circumferential surface Ba, main shaft 103 with tool holder 10 is rotated about rotation axis L1, and at the same time, the downward movement of main shaft head 102 is restarted. When main shaft 103 with tool holder 10 is rotated, support shaft 14 with form roller 12 is caused to rotate about rotation axis L3 and turn around rotation axis L1 together with tool holder 10. By synchronizing the rotation of main shaft 103 and the downward movement of main shaft head 102, form roller 12 rolls on circumferential surface Ba and continuously forms the microscopic recesses on circumferential surface Ba along a spiral trail of the rolling motion of form roller 12 which is inclined relative to a plane perpendicular to central axis L2 of cylinder bore B. As illustrated in FIG. 21, there are provided microscopic recesses Q that are formed along the direction of the rolling motion of form roller 12 as indicated by arrow. Rows of microscopic recesses Q are thus inclined relative to plane P perpendicular to central axis L2 of cylinder bore B as shown in FIG. 21.

Figure 22A:
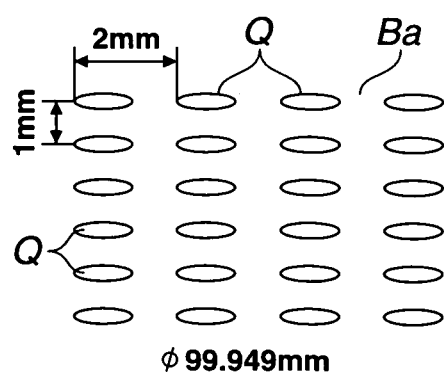
FIGS. 22A and 22B are diagrams that illustrate different patterns of the microscopic recesses formed by the apparatus of the seventh embodiment of the present invention, respectively.
Figure 22B:
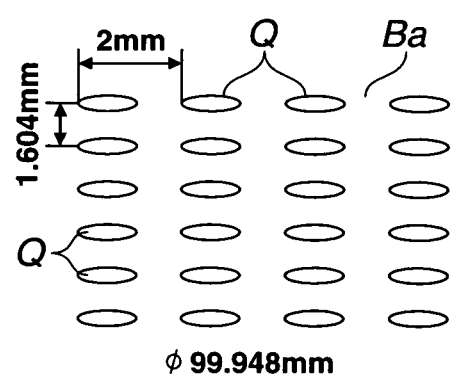

When the downward movement of main shaft head 102 is synchronously performed with the rotation of main shaft 103, a speed of the downward movement of main shaft head 102 is varied on the basis of the diameter of cylinder bore B which is previously measured by contact diameter measuring device 251 or non-contact diameter measuring device 252. In this embodiment, as shown in FIGS. 22A and 22B, there is provided a pattern of microscopic recesses Q in which microscopic recesses Q formed every turn are aligned with one another along central axis L2 of cylinder bore B.

Specifically, in a case where cylinder bore B has a relatively small diameter, the downward movement speed of main shaft head 102 is increased such that the inclination angle of the respective rows of microscopic recesses Q becomes large. Conversely, in a case where cylinder bore B has a relatively large diameter, the downward movement speed of main shaft head 102 is decreased such that the inclination angle of the row of microscopic recesses Q becomes small. Thus, the downward movement speed of main shaft head 102 is controlled such that the spiral trail of form roller 12 has a same length per turn even when the diameter of cylinder bore B is varied. The length per turn is expressed by the following formula (1).

$$\sqrt{(\phi \times \pi)^2 + Dm^2} \qquad (1)$$

wherein $\phi$ represents diameter of cylinder bore B, and Dm represents an amount of the downward movement of main shaft head 102 with respect to one turn of form roller 12.

The diameter of form roller 12 and intervals between the microprojections of the outer peripheral surface of form roller 12 are constant. Therefore, if the downward movement speed of main shaft head 102 is varied such that the spiral trail of form roller 12 has a same length per turn regardless of the diameter of cylinder bore B, there can be provided the patterns of microscopic recesses Q as shown in FIGS. 22A and 22B in which microscopic recesses Q formed at respective turns of form roller 12 are aligned with one another along central axis L2 of cylinder bore B.

FIG. 22B shows the pattern of microscopic recesses Q on circumferential surface Ba defining cylinder bore B that has a diameter smaller than a diameter of cylinder bore B that is defined by circumferential surface Ba with the pattern of microscopic recesses Q as shown in FIG. 22A. In the patterns of microscopic recesses Q as shown in FIGS. 22A and 22B, microscopic recesses Q are substantially aligned with one another along central axis L2 of cylinder bore B. As compared with the pattern of microscopic recesses Q as shown in FIG. 22A, the pattern of microscopic recesses Q as shown in FIG. 22B has a larger interval between microscopic recesses Q of an upper row and microscopic recesses Q of a lower row. The pattern of microscopic recesses Q as shown in FIG. 22B is provided by increasing the downward movement speed of main shaft head 102 so as to increase the inclination angle of the respective rows of microscopic recesses Q.

Apparatus 500 of this embodiment can attain the same effects as those of the fourth embodiment. Further, even when adjacent cylinder bores B have diameters slightly different from each other within tolerance, apparatus 500 of this embodiment can provide substantially the same pattern of microscopic recesses Q on circumferential surfaces Ba that define respective cylinder bores B by varying the downward movement speed of main shaft head 102 on the basis of the diameters of respective cylinder bores B. Therefore, the microscopic recesses can effectively serve as an oil retention portions on a slide portion of circumferential surface Ba which comes into slide contact with an outer peripheral surface of a piston. This results in an enhanced performance of the engine.

Figure 23:
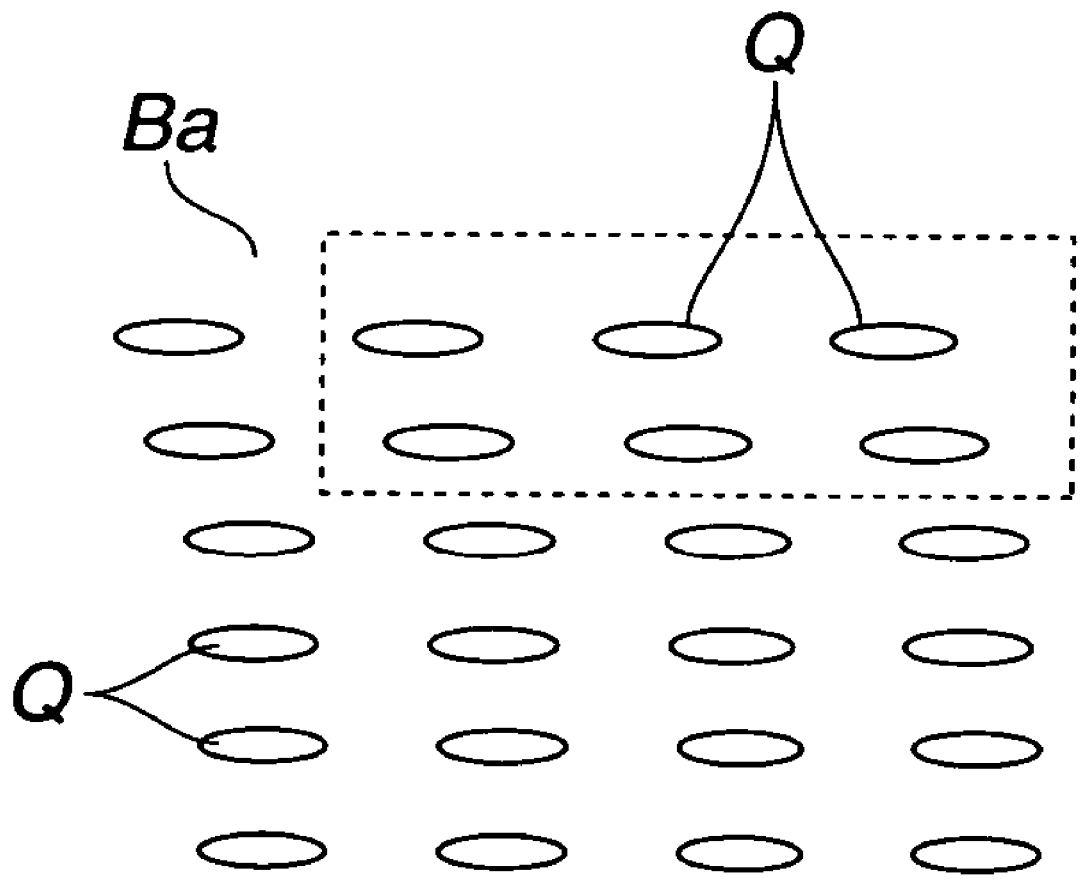
FIG. 23 is a diagram that illustrates a pattern of the microscopic recesses formed by the apparatus of an eighth embodiment of the present invention.
Figure 24:
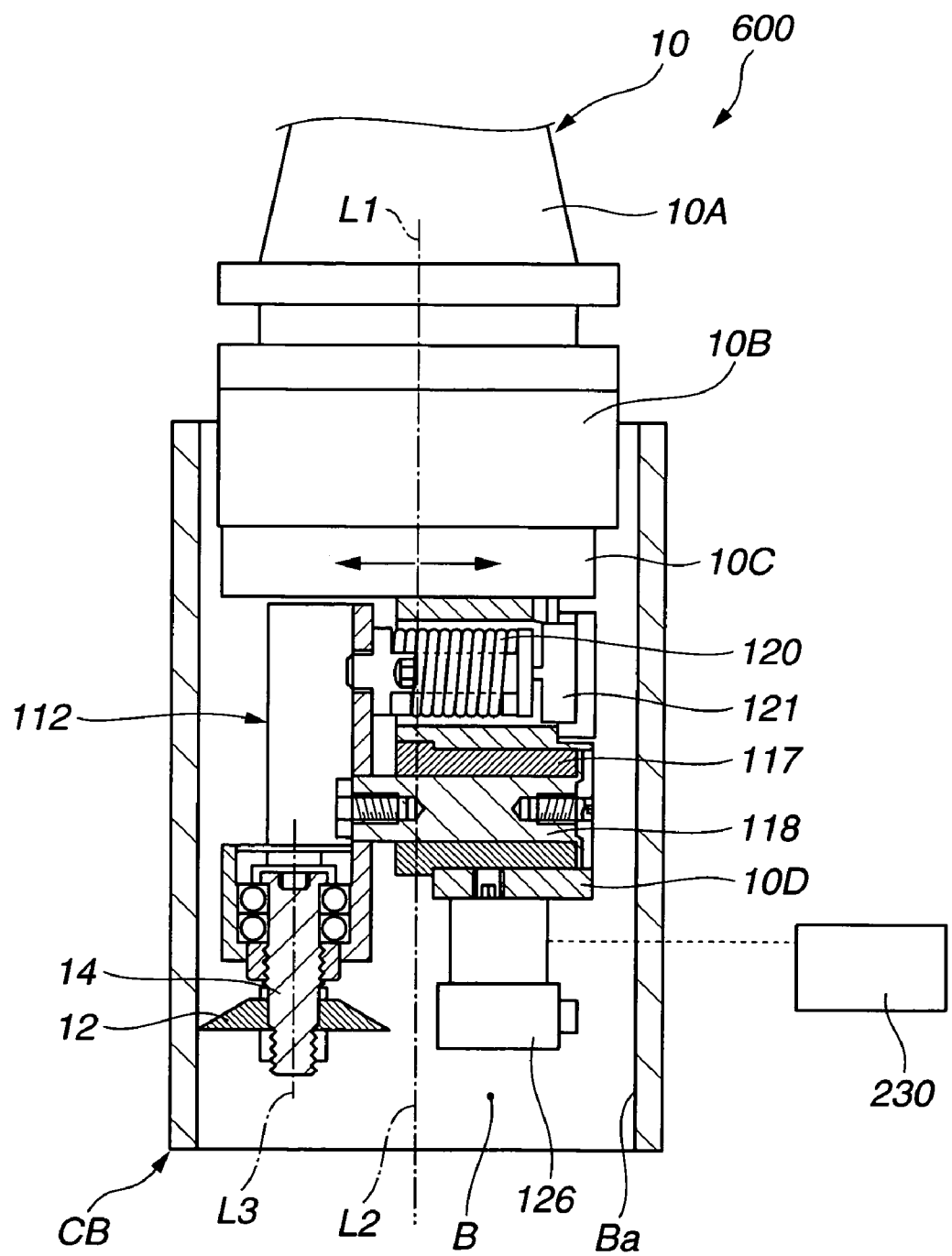
FIG. 24 is a vertical cross-section of an apparatus according to the eighth embodiment of the present invention.

Referring to FIGS. 23-24, there is shown an eighth embodiment of the apparatus of the present invention. The eighth embodiment differs from the fifth embodiment as shown in FIG. 15 in provision of a surface measuring device. Like reference numerals denote like parts, and therefore, detailed explanations therefor are omitted. As illustrated in FIG. 24, apparatus 600 of this embodiment includes surface measuring device 230 that measures a pattern of the microscopic recesses formed on circumferential surface Ba that defines cylinder bore B. Surface measuring device 230 is electronically connected with CCD camera 126 that serves as an input section of surface measuring device 230. CCD camera 126 photographs microscopic recesses Q within a predetermined region of circumferential surface Ba and transmits a picture signal indicative of a picture image of microscopic recesses Q to surface measuring device 230. For instance, the predetermined region is indicated by dotted line in FIG. 23. Surface measuring device 230 detects an error of an actual pattern of microscopic recesses Q within the predetermined region with respect to a reference pattern of microscopic recesses Q on the basis of the picture signal from CCD camera 126. That is, the error includes an offset of the rows of microscopic recesses Q in the direction along central axis L2 of cylinder bore B. When the error of the actual pattern of microscopic recesses Q is detected, a speed of the relative axial movement of cylinder bore B and tool holder 10 is varied so as to compensate the error, on the basis of the error. In this embodiment, the downward movement speed of main shaft head 102 is varied. This causes change of the inclination angle of the rows of microscopic recesses Q. As a result, as illustrated at a lower part of FIG. 23, the pattern of microscopic recesses Q in which the error is compensated is provided.

In apparatus 600 of this embodiment, the diameter measuring device used in apparatus 500 of the seventh embodiment can be omitted. Further, in apparatus 600 of this embodiment, load applying member 120 and radial drive 10C serve as a form roller pressing drive that presses form roller 12 against circumferential surface Ba that defines cylinder bore B.

Apparatus 600 of this embodiment can attain the same effects as those of the seventh embodiment. Further, apparatus 600 and the method of the present invention can provide the pattern of microscopic recesses Q which is substantially the same as the reference pattern thereof in which microscopic recesses Q formed at respective turns of form roller 12 are aligned with one another along central axis L2 of cylinder bore B.

Figure 25:
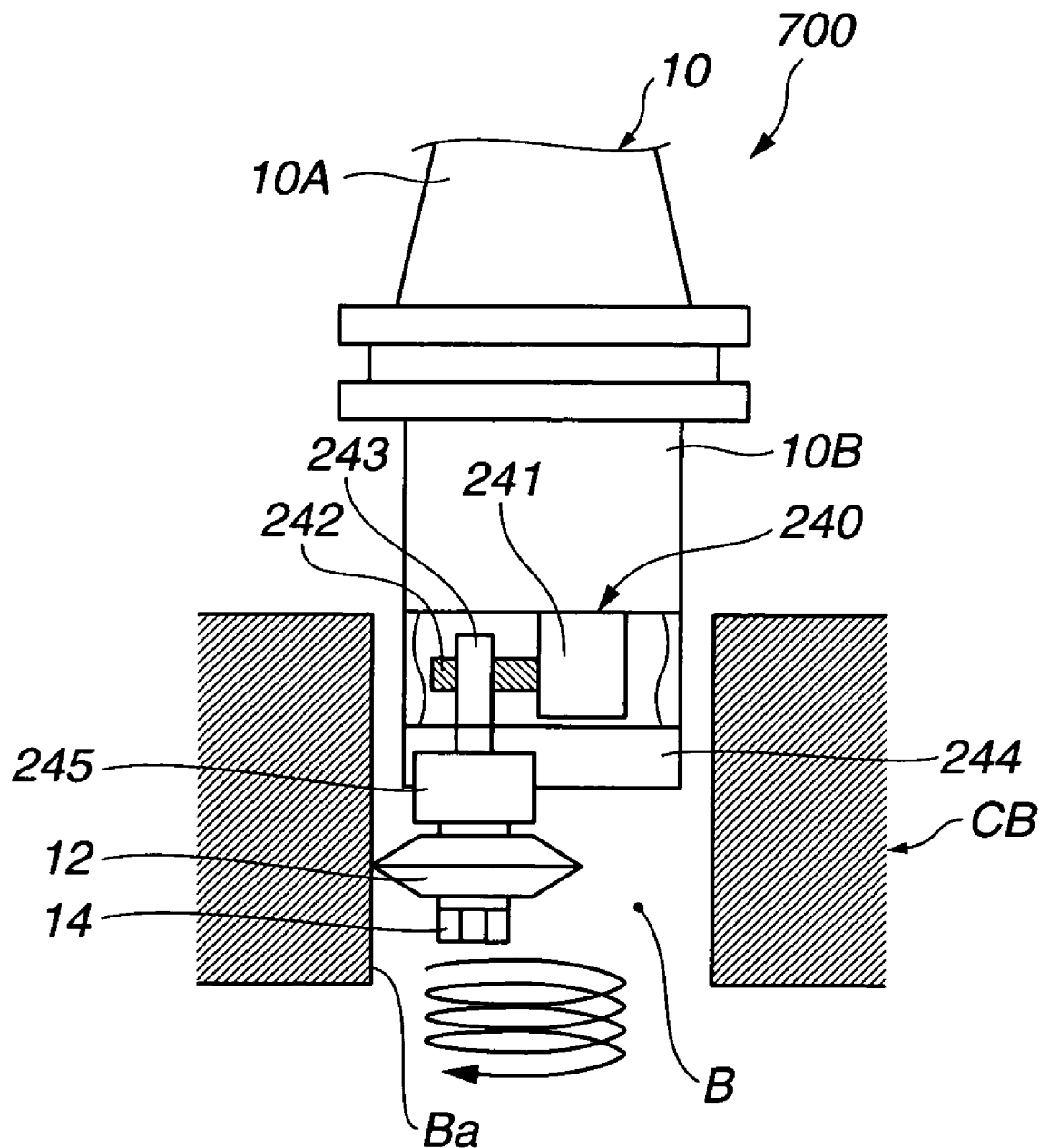
FIG. 25 is a vertical cross-section of an apparatus according to a ninth embodiment of the present invention.

Referring to FIG. 25, there is shown a ninth embodiment of the apparatus of the present invention. The eighth embodiment differs from the eighth embodiment in construction of the form roller pressing drive. As illustrated in FIG. 25, apparatus 700 of this embodiment includes form roller pressing drive 240 that includes stepping motor 241 as a drive source, screw shaft 242 that is an output shaft of stepping motor 241, and ball built-in nut 243 that cooperates with screw shaft 242 to form a ball screw. Roller support member 245 is connected with nut 243 and supports form roller 12 via support shaft 14. Roller support member 245 is guided by guide 244 in the radial direction of cylinder bore B.

Apparatus 700 of this embodiment can attain the same function and effects as those of apparatus 600 of the eighth embodiment. Further, in apparatus 700 of this embodiment, form roller pressing drive 240 acts as both load applying member 120 and radial drive 10C of apparatus 600 of eighth embodiment. This can realize further simplified construction of the apparatus. Further, with the provision of stepping motor 241 as the drive source, the operation of forming the microscopic recesses can be performed with further enhanced accuracy.

The apparatus of the present invention may include other members or mechanisms for rotating the cylinder block and moving the cylinder block in the radial and axial directions of the cylinder bore instead of the rotary drive, the axial drive and the radial drive. Further, an elastic member hydraulically or pneumatically deformable in the radial direction of the form roller hydraulic pressure, and a pneumatic or hydraulic actuator can be used as the form roller pressing drive. In the case of using the pneumatic or hydraulic actuator, the load applied to the form roller can be more flexibly varied. Further, the microscopic projections on the outer peripheral surface of the form roller are not limited to the dimple-shape and the single row, and may be formed into various shapes and in multiple rows. Further, various patterns of the microscopic recesses may be provided, for instance, as a zigzag pattern in which the microscopic recesses are staggered in the axial direction of the cylinder bore, or an offset pattern in which the microscopic recesses are gradually offset in one circumferential direction every turn of the form roller.

Further, the apparatus and method of the present invention may be used for formation of microscopic recesses on a circumferential surface that defines a cylindrical bore of various kinds of members as a workpiece, without being limited to the cylinder block and the cylindrical member of the above embodiments. The workpiece may be a crankshaft, a camshaft and a balance shaft of an engine for automobiles. When the crankshaft is used as the workpiece, the microscopic recesses are formed on an outer circumferential surface of a crank journal or an outer circumferential surface of a crankpin. When the camshaft is used as the workpiece, the microscopic recesses are formed on an outer circumferential surface of a cam journal or an outer circumferential surface of a cam lobe. When the balance shaft is used as the workpiece, the microscopic recesses are formed on an outer circumferential surface of a journal thereof. In these cases, the microscopic recesses serve as oil retention portions on the circumferential surface that defines the cylindrical bore, so that the rotation and frictional performance of the parts can be enhanced. This can serve for enhancing a performance of the engine.

This application is based on prior Japanese Patent Application No. 2004-368628 filed on Dec. 21, 2004, Japanese Patent Application No. 2005-087556 filed on Mar. 25, 2005, Japanese Patent Application No. 2005-157033 filed on May 30, 2005 and Japanese Patent Application No. 2005-157035 filed on May 30, 2005. The entire contents of the Japanese Patent Application Nos. 2004-368628, 2005-087556, 2005-157033 and 2005-157035 are hereby incorporated by reference.

Although the invention has been described above by reference to certain embodiments of the invention, the invention is not limited to the embodiments described above. Modifications and variations of the embodiments described above will occur to those skilled in the art in light of the above teachings. The scope of the invention is defined with reference to the following claims.

What is claimed is:

1. An apparatus for forming microscopic recesses on a circumferential surface that defines a cylindrical bore in a workpiece, the apparatus comprising:
    a main shaft;
    a tool holder disposed on the main shaft so as to be in axial alignment with the main shaft, the tool holder being rotatable about a rotation axis together with the main shaft;
    a form roller support disposed on the tool holder, the form roller support including a support shaft parallel to the main shaft;
    a form roller supported on the support shaft of the form roller support so as to be rotatable together with the support shaft, the form roller being formed with microscopic projections on an outer peripheral surface thereof;
    a load applying member that applies a load to the form roller support in a radial direction of the form roller to press the microscopic projections of the form roller against the circumferential surface that defines the cylindrical bore in the workpiece under condition that the rotation axis of the tool holder is in alignment with a central axis of the cylindrical bore; and
    a rotational resistance varying member that varies rotational resistance of the form roller.

2. The apparatus as claimed in claim 1, wherein the form roller support further includes a bearing that supports the support shaft to be rotatable, and the rotational resistance varying member comprises a set screw that adjusts a pre-load applied to the bearing.

3. The apparatus as claimed in claim 1, wherein the rotational resistance varying member comprises a friction member that brakes the support shaft in contact therewith.

4. The apparatus as claimed in claim 1, further comprising a drive source that drives the rotational resistance varying member, the drive source being one of a motor and an actuator.

5. The apparatus as claimed in claim 3, further comprising a drive source that drives the friction member, the drive source being one of a motor and an actuator.

6. The apparatus as claimed in claim 1, wherein the rotational resistance varying member comprises an electromagnetic brake.

7. The apparatus as claimed in claim 1, further comprising an axial drive that causes a relative axial movement of the workpiece and the form roller support with the form roller in a direction of the central axis of the cylindrical bore in the workpiece.

8. The apparatus as claimed in claim 1, further comprising a radial drive that causes a unitary movement of the form roller support, the form roller and the rotational resistance varying member in a direction perpendicular to the rotation axis of the tool holder, the radial drive being disposed on the tool holder.

9. The apparatus as claimed in claim 8, wherein the load applying member comprises a compression coil spring.

10. The apparatus as claimed in claim 8, wherein the load applying member comprises an actuator.

11. The apparatus as claimed in claim 1, further comprising a load detector that detects the load applied to the form roller support.

12. The apparatus as claimed in claim 11, wherein the load detector comprises a load cell.

13. The apparatus as claimed in claim 1, further comprising a monitor that monitors a pattern of the microscopic recesses formed on the circumferential surface that defines the cylindrical bore in the workpiece.

14. The apparatus as claimed in claim 13, wherein the monitor comprises a CCD camera.

15. The apparatus as claimed in claim 13, further comprising a rotational resistance control unit that operates the rotational resistance varying member to control the rotational resistance of the form roller on the basis of the pattern of the microscopic recesses which is monitored by the monitor.

16. A method of forming microscopic recesses on a circumferential surface that defines a cylindrical bore in a workpiece, by using the apparatus according to claim 1, the method comprising:
    placing the tool holder and the workpiece in an axially aligned position in which the rotation axis of the tool holder and a central axis of the cylindrical bore are in alignment with each other;
    pressing the microscopic projections of the form roller against the circumferential surface that defines the cylindrical bore in the workpiece using the load applying member, and at the same time, rotating the tool holder and the workpiece relative to each other about the rotation axis; and
    operating the rotational resistance varying member to vary the rotational resistance of the form roller.

17. A method of forming microscopic recesses on a circumferential surface that defines a cylindrical bore in a workpiece, by using the apparatus according to claim 1, the method comprising:
    placing the tool holder and the workpiece in an axially aligned position in which the rotation axis of the tool holder and a central axis of the cylindrical bore are in alignment with each other;
    pressing the microscopic projections of the form roller against the circumferential surface that defines the cylindrical bore in the workpiece using the load applying member, and at the same time, rotating the tool holder about the rotation axis to thereby form a pattern of the microscopic recesses on the circumferential surface; and
    operating the rotational resistance varying member to vary the rotational resistance of the form roller and control the pattern of the microscopic recesses to be formed, on a basis of the formed pattern of the microscopic recesses.

18. A method of forming microscopic recesses on a circumferential surface that defines a cylindrical bore in a workpiece, by using the apparatus according to claim 13, the method comprising:
    placing the tool holder and the workpiece in an axially aligned position in which the rotation axis of the tool holder and the central axis of the cylindrical bore are in alignment with each other;
    pressing the microscopic projections of the form roller against the circumferential surface that defines the cylindrical bore in the workpiece by the load applying member, and at the same time, rotating the tool holder about the rotation axis to thereby form a pattern of the microscopic recesses on the circumferential surface;

monitoring the formed pattern of the microscopic recesses on the circumferential surface that defines the cylindrical bore in the workpiece by the monitor; and operating the rotational resistance varying member to vary the rotational resistance of the form roller and control the pattern of the microscopic recesses to be formed, on a basis of the formed pattern of the microscopic recesses which is monitored by the monitor.

19. The method as claimed in claim 16, further comprising causing a relative axial movement of the workpiece and the form roller support with the form roller in a direction of the central axis of the cylindrical bore in the workpiece.

20. The apparatus as claimed in claim 1, wherein the form roller support has a rotation axis parallel to the rotation axis of the tool holder, the form roller is turnable about the rotation axis of the tool holder and rotatable about the rotation axis of the form roller support, while being pressed against the circumferential surface that defines the cylindrical bore of the workpiece during rotation of the tool holder to thereby form a plurality of microscopic recesses on the circumferential surface that defines the cylindrical bore of the workpiece, and wherein the rotational resistance varying member acts to vary rotational resistance of the support shaft and the rotational resistance of the form roller through the support shaft.

* * * * *